(12) United States Patent
Pal et al.

(10) Patent No.: US 12,532,259 B2
(45) Date of Patent: Jan. 20, 2026

(54) ADAPTIVE TRACKING LOOP UPDATES IN USER EQUIPMENT

(71) Applicant: QUALCOMM Incorporated, San Diego, CA (US)

(72) Inventors: Arnab Pal, Hyderabad (IN); Linzhe Li, San Diego, CA (US); Huan Xu, San Diego, CA (US); Uzma Khan Qazi, San Diego, CA (US); Vishnu Namboodiri Karakkad Kesavan Namboodiri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 18/040,919

(22) PCT Filed: Sep. 29, 2021

(86) PCT No.: PCT/US2021/052690
§ 371 (c)(1),
(2) Date: Feb. 7, 2023

(87) PCT Pub. No.: WO2022/072524
PCT Pub. Date: Apr. 7, 2022

(65) Prior Publication Data
US 2023/0300746 A1 Sep. 21, 2023

(30) Foreign Application Priority Data
Sep. 30, 2020 (IN) .............................. 202041042490

(51) Int. Cl.
*H04W 52/02* (2009.01)
*H04W 76/28* (2018.01)
*H04W 74/0833* (2024.01)

(52) U.S. Cl.
CPC ....... *H04W 52/0225* (2013.01); *H04W 76/28* (2018.02); *H04W 74/0833* (2013.01)

(58) Field of Classification Search
CPC ......... H04W 52/0225; H04W 74/0833; H04W 76/28; H04W 56/0015; H04W 56/0035;
(Continued)

(56) References Cited

U.S. PATENT DOCUMENTS 9,872,252 B1 1/2018 Ang et al.
11,089,548 B2 * 8/2021 Qu ....................... H04B 17/336
(Continued)

FOREIGN PATENT DOCUMENTS

CN  104160755 A  11/2014
CN  104640216 A  5/2015
(Continued)

OTHER PUBLICATIONS

International Search Report and Written Opinion—PCT/US2021/052690—ISA/EPO—Jan. 21, 2022.
(Continued)

*Primary Examiner* — Dhaval V Patel
(74) *Attorney, Agent, or Firm* — Loza & Loza, LLP

(57) ABSTRACT

A wireless communication device can adaptively perform tracking loop updates for rude wake-up events when operating in a discontinuous reception (DRX) mode. In an aspect, the wireless communication device can perform one or more tracking loop updates, such as time tracking loop (TTL) updates and frequency tracking loop (FTL) updates, based on a time difference between a last tracking loop update and a warm-up occasion associated with a rude wake-up event being greater than a threshold. In addition, in response to the time difference being less than or equal to the
(Continued)

threshold, the wireless communication device can perform the rude wake-up event without performing the one or more tracking loop updates.

30 Claims, 13 Drawing Sheets

(58) Field of Classification Search
CPC ............ H04W 52/0216; H04W 56/001; Y02D 30/70; H04B 7/0626; H04B 17/336
See application file for complete search history.

(56) References Cited

U.S. PATENT DOCUMENTS

| | | | |
|---|---|---|---|
| 2010/0331019 A1* | 12/2010 | Bhattacharjee ... | H04W 52/0229 455/458 |
| 2013/0176873 A1 | 7/2013 | Ji et al. | |
| 2014/0301263 A1* | 10/2014 | Ji ..................... | H04W 52/0212 370/311 |
| 2017/0289910 A1 | 10/2017 | Islam et al. | |
| 2020/0221384 A1 | 7/2020 | Ang et al. | |
| 2020/0245333 A1* | 7/2020 | Lin ..................... | H04L 1/0026 |
| 2020/0267648 A1 | 8/2020 | Kim et al. | |

FOREIGN PATENT DOCUMENTS

| | | |
|---|---|---|
| CN | 105939536 A | 9/2016 |
| CN | 107079401 A | 8/2017 |
| CN | 109792684 A | 5/2019 |
| CN | 106879002 B | 3/2020 |
| CN | 111345096 A | 6/2020 |
| WO | 2014179921 A1 | 11/2014 |
| WO | 2018063340 A1 | 4/2018 |
| WO | 2018063673 A1 | 4/2018 |
| WO | 2019083096 A1 | 5/2019 |

OTHER PUBLICATIONS

Qualcomm Incorporated: "Further Discussion of Wake-up Signal Functions", 3GPP Draft, 3GPP TSG RAN WG1 Meeting #93, R1-1807107, WUS Functions, 3rd Generation Partnership Project (3GPP), Mobile Competence Centre, 650, Route Des Lucioles, F-06921 Sophia-Antipolis Cedex, France, vol. RAN WG2, No. Busan, Korea, May 21, 2018-May 25, 2018, May 20, 2018 (May 20, 2018), XP051442305, 7 Pages, Paragraph 4.

Lin J.-Z., et al., "DPM-based Method for Tracking Maneuvering Targets in Wireless Sensor Networks", Journal on Communications, vol. 31, No. 12, Dec. 25, 2010, pp. 90-96, DOI:CNKI:SUN:TXXB. 0.2010-12-012.

Liu G-H., et al., "Design and Implementation of a Carrier Tracking Loop for a GPS Software Receiver", Computer Simulation, vol. 28, No. 1, Jan. 15, 2011, pp. 348-351.

* cited by examiner

ADAPTIVE TRACKING LOOP UPDATES IN USER EQUIPMENT

CROSS-REFERENCE TO RELATED APPLICATIONS

This application is the U.S. national stage of PCT patent application number PCT/US21/52690 filed on Sep. 29, 2021. Application Number PCT/US21/52690 claims priority to and the benefit of Indian Patent Application number 202041042490, filed Sep. 30, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to adaptively performing tracking loop updates in discontinuous reception mode.

INTRODUCTION

In wireless communication systems, such as those specified under standards for 5G New Radio (NR), a user equipment (UE) may operate in a discontinuous reception (DRX) mode. The DRX mode allows the UE to remain in a low-power state, such as a sleep state, for a period of time. Between sleep periods, the UE may wake-up (e.g., perform a power-up operation) to enter an active state and communicate with the network. The UE may enter the DRX mode in a radio resource control (RRC) connected state (connected mode DRX (C-DRX)) or an RRC idle state (idle mode DRX (I-DRX)). In C-DRX, the UE may be configured with a DRX ON duration and a DRX OFF duration. During the DRX ON duration, the UE may wake-up and monitor for a physical downlink control channel (PDCCH) and transmit or receive user data traffic. In I-DRX, the UE may periodically wake-up during DRX ON durations to receive a page based on a paging cycle.

In either the C-DRX mode or I-DRX mode, when data arrives in an outgoing buffer of the UE, the UE may receive an internal wake-up request to perform a rude wake-up event while the UE is in a low-power state. For example, the rude wake-up event may include transmitting a random access channel (RACH) message in I-DRX mode or transmitting a scheduling request (SR) in C-DRX mode. Before the rude wake-up event, the UE may schedule one or more tracking loops during a warmup period to improve UE performance. For example, the UE may schedule a time tracking loop (TTL), frequency tracking loop (FTL), and/or other tracking loops.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a user equipment (UE) configured for wireless communication includes a wireless transceiver, a memory, and a processor coupled to the wireless transceiver and the memory. The processor and the memory can be configured to enter a sleep state for a sleep period in a discontinuous reception (DRX) mode, transition to an active state to perform a rude wake-up event during the sleep period, identify a time difference between a last tracking loop update and a warm-up occasion associated with the rude wake-up event, perform at least one tracking loop update during the warm-up occasion prior to performing the rude wake-up event in response to the time difference being greater than a threshold, and perform the rude wake-up event without performing the at least one tracking loop update in response to the time difference being less than or equal to the threshold.

Another example provides a method for wireless communication at a user equipment (UE). The method includes entering a sleep state for a sleep period in a discontinuous reception (DRX) mode, transitioning to an active state to perform a rude wake-up event during the sleep period, identifying a time difference between a last tracking loop update and a warm-up occasion associated with the rude wake-up event, performing at least one tracking loop update during the warm-up occasion prior to performing the rude wake-up event in response to the time difference being greater than a threshold, and performing the rude wake-up event without performing the at least one tracking loop update in response to the time difference being less than or equal to the threshold.

Another example provides a wireless communication device configured for wireless communication. The wireless communication device can include means for entering a sleep state for a sleep period in a discontinuous reception (DRX) mode, means for transitioning to an active state to perform a rude wake-up event during the sleep period, means for identifying a time difference between a last tracking loop update and a warm-up occasion associated with the rude wake-up event, means for performing at least one tracking loop update during the warm-up occasion prior to performing the rude wake-up event in response to the time difference being greater than a threshold, and means for performing the rude wake-up event without performing the at least one tracking loop update in response to the time difference being less than or equal to the threshold.

Another example provides an article of manufacture for use by a user equipment (UE) in a wireless communication network. The article includes a computer-readable medium having stored therein instructions executable by one or more processors of the UE to enter a sleep state for a sleep period in a discontinuous reception (DRX) mode, transition to an active state to perform a rude wake-up event during the sleep period, identify a time difference between a last tracking loop update and a warm-up occasion associated with the rude wake-up event, perform at least one tracking loop update during the warm-up occasion prior to performing the rude wake-up event in response to the time difference being greater than a threshold, and perform the rude wake-up event without performing the at least one tracking loop update in response to the time difference being less than or equal to the threshold.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

DETAILED DESCRIPTION

Figure 1:
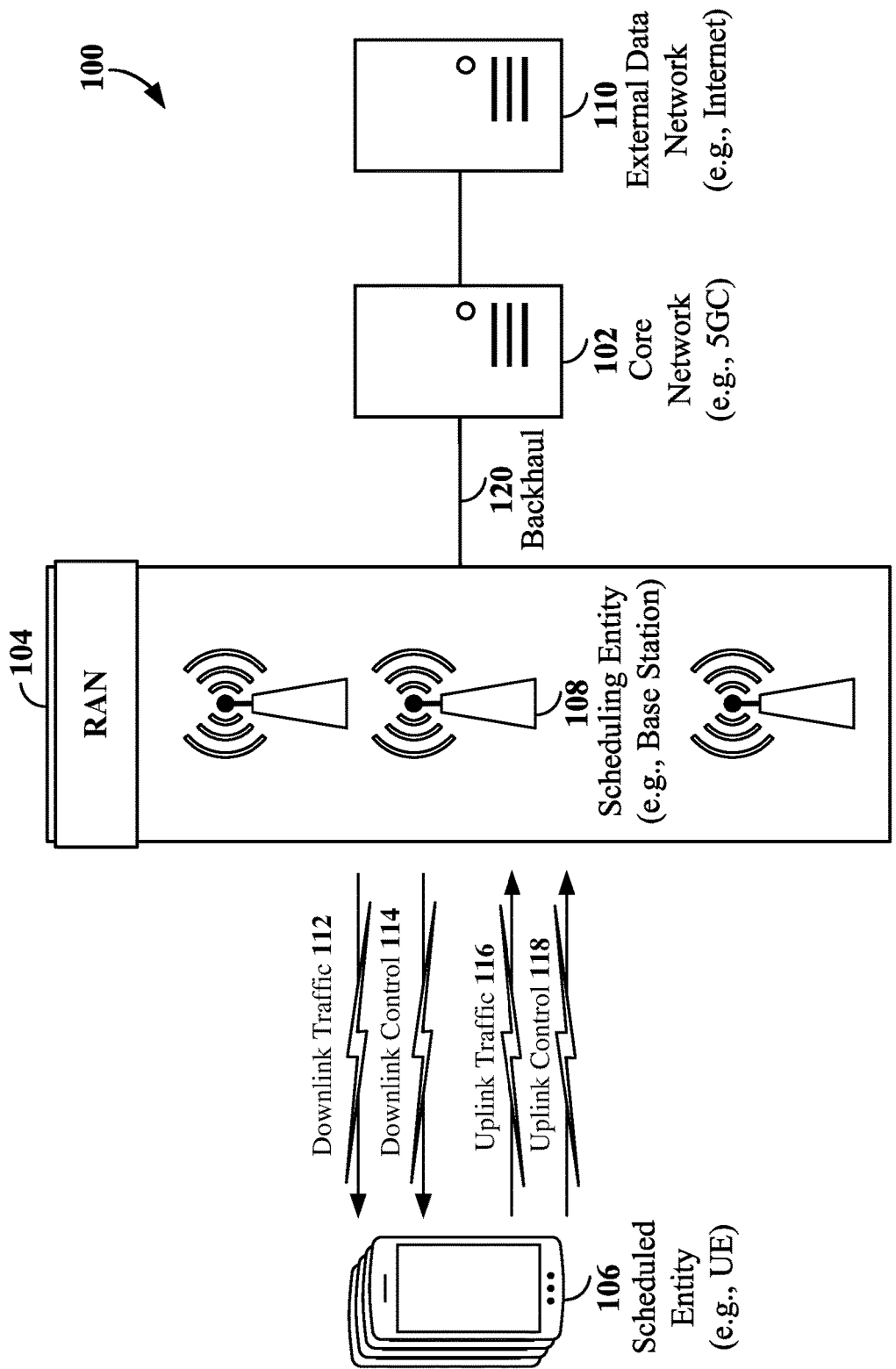
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements, end-user devices, etc. of varying sizes, shapes and constitution.

Various aspects of the disclosure relate to a UE adaptively performing tracking loop updates for rude wake-up events when operating in a discontinuous reception (DRX) mode. During a sleep period of the DRX mode, the UE may transition to an active state to perform a rude wake-up event. For example, when operating in I-DRX mode, the UE may wake-up suddenly from a sleep state to transmit a random access channel (RACH) message to the network to enter an RRC connected state when uplink data arrives in the UEs buffer. As another example, when operating in C-DRX mode, the UE may wake-up suddenly from a sleep state to transmit a scheduling request to the network when uplink data arrives in the UEs buffer.

Prior to performing the rude wake-up event, the UE may selectively perform one or more tracking loops, such as time tracking loops (TTLs) or frequency tracking loops (FTLs), during a warm-up occasion. In an aspect, the UE may perform the one or more tracking loops when a time difference between a last tracking loop update and the warm-up occasion associated with the rude wake-up event is greater than a threshold. However, when the time difference is less than or equal to the threshold, the UE may perform the rude wake-up event without performing the one or more tracking loop updates. In this example, the UE may utilize the last tracking loop update when performing the rude wake-up event.

In some examples, a threshold value for the threshold may be selected from a plurality of threshold values, each associated with a respective cell quality mode of a cell in communication with the UE. The cell quality mode may include, for example, a cell excellent mode, a cell normal mode, or a cell panic mode. For example, a higher threshold value may be utilized in the cell excellent mode, while a lower threshold value may be utilized in the cell panic mode.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station. In addition, one or more of the base stations may have a disaggregated configuration.

The radio access network (RAN) 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile phone, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity (e.g., base station) 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., one or more UEs 106). Broadly, the scheduling entity, such as base station 108, is a node or device responsible for scheduling traffic in a wireless communication network, including the downlink traffic 112 and, in some examples, uplink traffic 116 from one or more scheduled entities (e.g., one or more UEs 106) to the scheduling entity (e.g., base station 108). On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity (e.g., base station 108). The scheduled entity (e.g., UE 106) may further transmit uplink control information 118, including but not limited to a scheduling request or feedback information, or other control information to the scheduling entity (e.g., base station 108).

In addition, the downlink and/or uplink control information 114 and/or 118 and/or the downlink and/or uplink traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
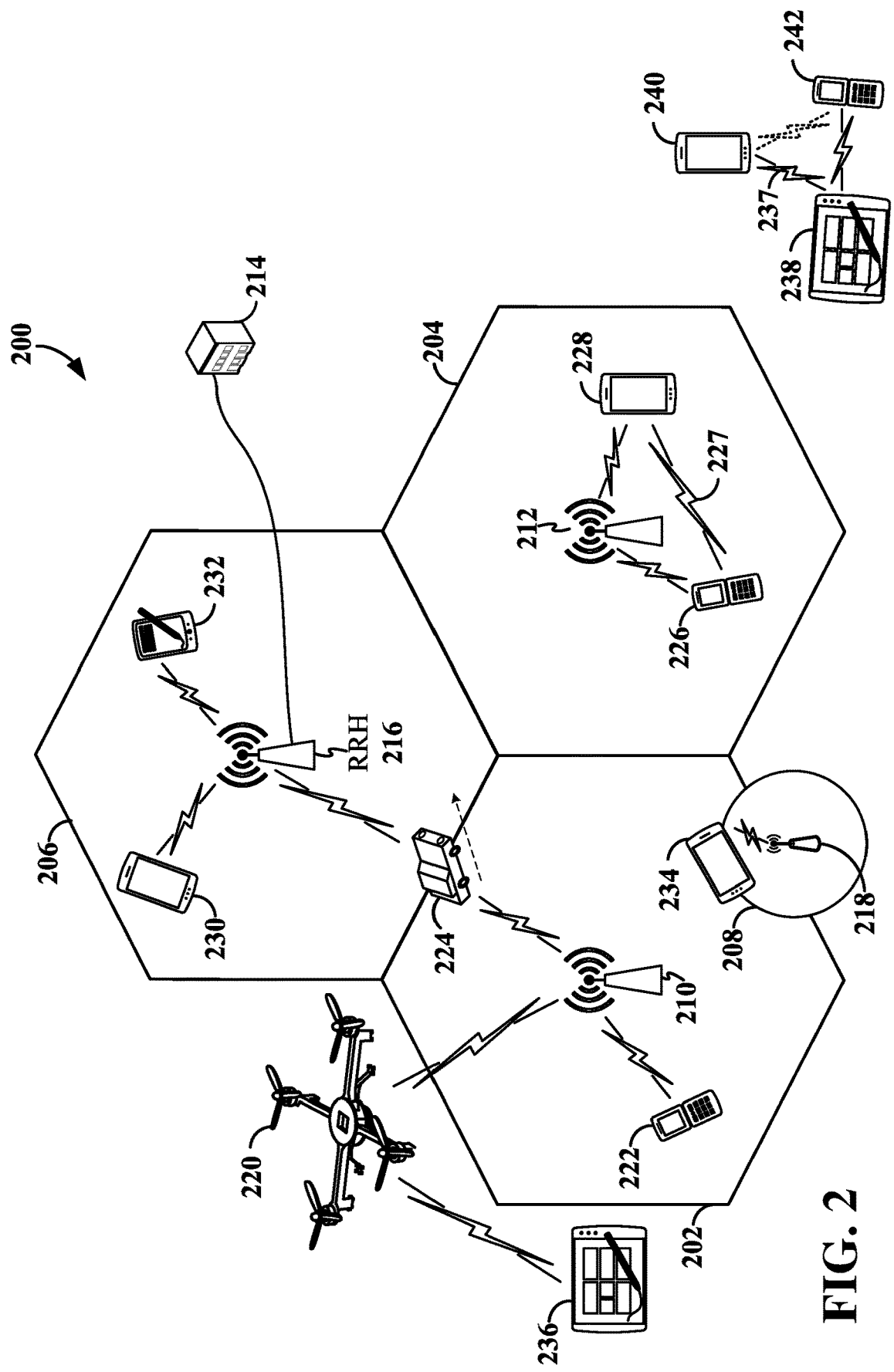
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station on UAV 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

The air interface in the radio access network (RAN) 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network (RAN) 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
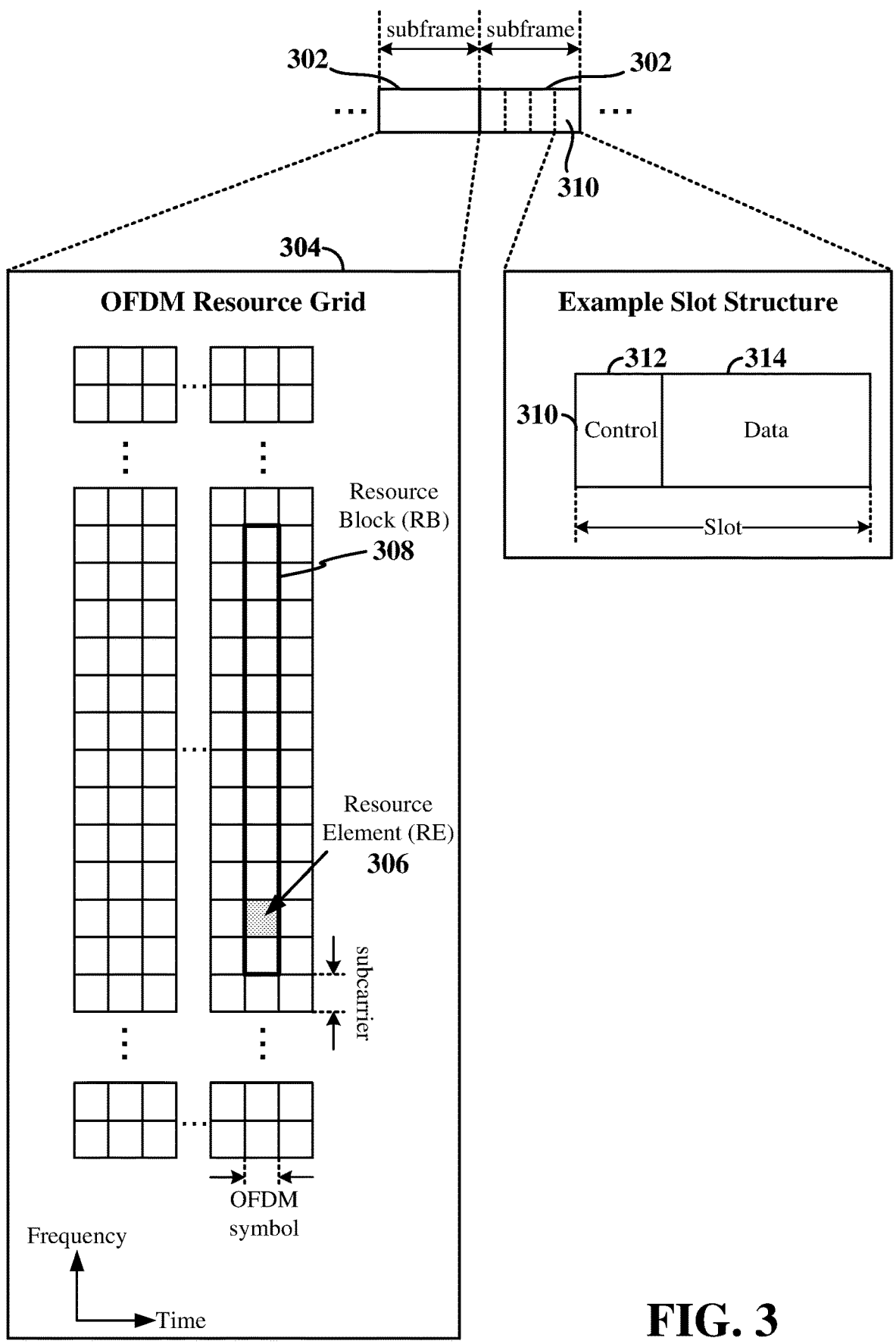
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of sub carriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) or sidelink devices (hereinafter collectively referred to as UEs or wireless communication devices) for downlink or uplink transmissions typically involves scheduling one or more resource elements (REs) 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Transmissions of data traffic from the base station to a UE may occur within downlink OFDM symbols of subframes or slots. The base station may indicate to a UE that the base station has data to transmit to the UE by transmitting scheduling information providing time-frequency resources (e.g., REs) allocated by the base station for the transmission of the data to the UE. The scheduling information may be included, for example, within DCI of a PDCCH transmitted at the beginning of a subframe or slot. The UE may monitor the PDCCHs in each subframe or slot to determine whether a downlink data transmission has been scheduled for the UE. However, since a UE may not receive data in every subframe or slot, the PDCCH monitoring process may lead to high battery consumption.

To reduce power consumption and extend battery life, a wireless communication device (e.g., a UE) may enter a discontinuous reception (DRX) mode. The DRX mode allows the wireless communication device to enter a sleep state (e.g., a low-power state) for a period of time. The wireless communication device may then periodically wake-up (e.g., perform a power-up operation) to communicate with the base station. The periodic repetition of cycling between sleep states and active states is referred to herein as DRX. DRX may be implemented by any type of wireless communication device, but may be a preferred mode for machine-type communication (MTC) devices, such as Narrowband Internet of Things (NB-IoT) devices, or other type of reduced-capability devices.

A wireless communication device may enter the DRX mode in a radio resource control (RRC) connected state (connected mode DRX (C-DRX)) or an RRC idle state (idle mode DRX (I-DRX)). The base station may configure various parameters for I-DRX mode and C-DRX mode and provide the DRX parameters to the UE through an upper layer RRC reconfiguration message (e.g., during handover) or via one or more SIBs (e.g., during initial attach).

Figure 4:
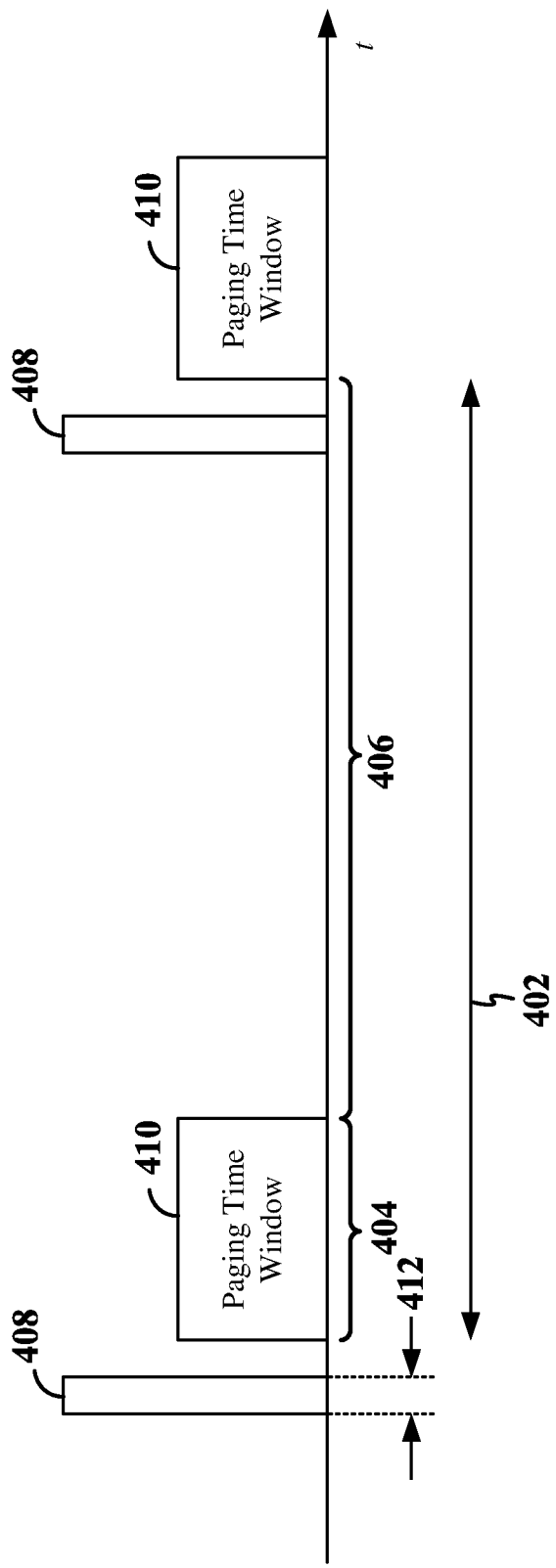
FIG. 4 is a diagram illustrating an example of idle mode discontinuous reception (I-DRX) according to some aspects.

FIG. 4 is a diagram illustrating an example of idle mode discontinuous reception (I-DRX) according to some aspects. A wireless communication device (e.g., a UE) may enter the I-DRX mode during RRC idle mode when the UE is not connected to the base station. For example, during initial cell access, the UE may receive a SIB (e.g., SIB2) including DRX parameters for the I-DRX mode. The UE may then transition to the RRC idle state and enter I-DRX mode for power savings.

The DRX idle mode (I-DRX) is characterized by a number of consecutive DRX cycles 402 in time (t). The duration of each DRX cycle 402 may correspond, for example, to a paging cycle set by the network. For example, the paging cycle may be defined in terms of radio frames and the UE may calculate the paging frames and paging occasions within the paging frames for the UE based on the paging cycle. Here, a paging frame corresponds to a radio frame in which the UE may wake-up to receive a page. In addition, a paging occasion corresponds to a subframe where a paging message intended for the UE may be received. In one DRX cycle 402, there is only one paging occasion for each UE.

In the example shown in FIG. 4, each DRX cycle 402 includes a DRX ON duration 404 and a DRX OFF duration 406. Here, the DRX cycle length (or DRX cycle duration) is equal to the time between the start of one DRX ON duration 404 and the start of the next DRX ON duration 404. The DRX OFF duration 406 corresponds to a period of inactivity where the wireless communication device does not communicate with the wireless communication network. Thus, during the DRX OFF duration 406, the wireless communication device may enter a sleep state or low-power state for a sleep period corresponding to the DRX OFF duration 406 to reduce power consumption. In some examples, the DRX OFF duration 406 may be 320 ms, 640 ms, 1280 ms, or 2560 ms.

Upon entering the DRX ON duration 404, the wireless communication device wakes-up by performing a power-up operation to enter an active state. The DRX ON duration 404 may include a paging time window 410 containing a paging occasion within which the wireless communication device may receive a paging message. For example, each paging time window 410 may follow a normal paging cycle (e.g., 1.28 seconds) utilized in the wireless communication network. If the wireless communication device receives a page during the paging time window 410, the wireless communication device may transition to an RRC connected state to receive a downlink data transmission from the base station and then re-transition back to an RRC idle state after receipt of the downlink data transmission. At the end of the paging time window 410 or upon transitioning back to the RRC idle state, the wireless communication device may again enter a sleep state or low-power state for the DRX OFF duration 406.

Prior to each paging time window 410 (e.g., prior to the subframe number (SFN) of the paging occasion at which the wireless communication device wakes up), the wireless communication device may schedule and perform one or more tracking loop updates 408 during a warm-up occasion 412. For example, the wireless communication device may perform a time tracking loop (TTL) update, frequency tracking loop (FTL) update, power delay profile (PDP) estimation update, and/or automatic gain control (AGC) update procedure during the warm-up occasion 412. For example, by implementing a TTL, the wireless communication device may be able to correct the timing error and optimize the starting point of the fast Fourier transform (FFT) window to minimize inter-symbol interference (ISI). FTLs may enable the wireless communication device to correct the carrier frequency offset due to RF impairments at both the wireless communication device and the base station and may further enable the wireless communication device to correct the Doppler shift due to mobility of the wireless communication device. In addition, the wireless communication device may perform a PDP estimation to compensate for dispersion or distribution of power over various paths due to multi-path propagation. The wireless communication device may further perform various AGC procedures to control the level or gain of the received signal in order to minimize the block error rate (BLER) of the received signal.

In some examples, the wireless communication device may receive a reference signal, such as a channel state information-reference signal (CSI-RS) or a synchronization signal block (SSB), transmitted by the base station for tracking loop updates. The SSB may be transmitted within a cell with known periodicity (e.g., 20 ms). Therefore, in some examples, the warm-up occasion 412 may occur at the known SSB transmission time prior to the wake-up time for the paging time window 410.

Figure 5:
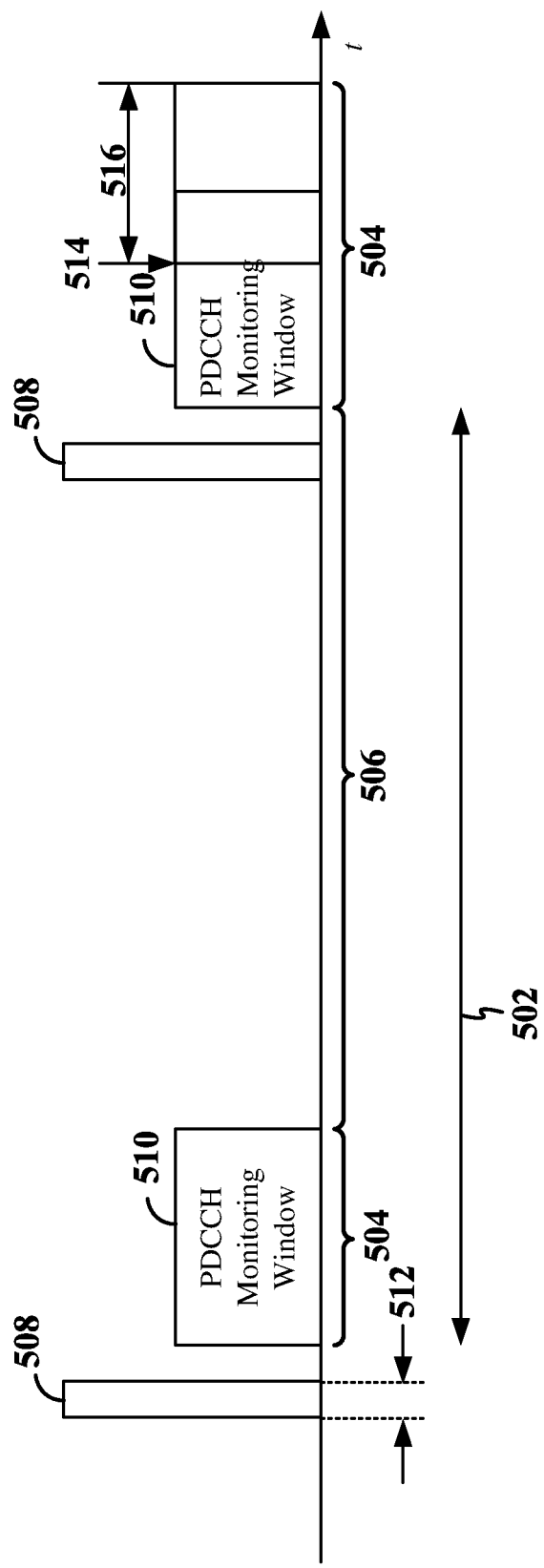
FIG. 5 is a diagram illustrating an example of connected mode discontinuous reception (C-DRX) according to some aspects.

FIG. 5 is a diagram illustrating an example of connected mode discontinuous reception (C-DRX) according to some aspects. A wireless communication device (e.g., a UE) may enter the C-DRX mode during RRC connected mode when the UE is connected to the base station. For example, during initial cell access, the UE may receive a SIB (e.g., SIB2) including DRX parameters for the C-DRX mode. In some examples, the UE may request a DRX cycle length during the initial attach procedure.

The DRX connected mode (C-DRX) is characterized by a number of consecutive DRX cycles 502 in time (t). The duration of each DRX cycle 502 may correspond, for example, to a long DRX cycle or a short DRX cycle, depending on the C-DRX configuration. In the example shown in FIG. 5, each DRX cycle 402 includes a DRX ON duration 504 and a DRX OFF duration 506. Here, the DRX cycle length (or DRX cycle duration) is equal to the time between the start of one DRX ON duration 504 and the start of the next DRX ON duration 504. The DRX OFF duration 506 corresponds to a period of inactivity where the wireless communication device does not communicate with the wireless communication network (e.g., the wireless communication device does not transmit any information to or receive any information from the wireless communication network). Thus, during the DRX OFF duration 506, the wireless communication device may enter a sleep state or low-power state for a sleep period corresponding to the DRX OFF duration 506 to reduce power consumption. In some examples, the DRX OFF duration 506 may be 40 ms, 80 ms, 160 ms, or 320 ms.

Upon entering the DRX ON duration 504, the wireless communication device wakes-up by performing a power-up operation to enter an active state. The DRX ON duration 504 may include a PDCCH monitoring window 510 within which the wireless communication device monitors for the transmission of a PDCCH from the base station to the wireless communication device. If the wireless communication device receives a PDCCH 514 during a PDCCH monitoring window 510, the wireless communication device may initiate a DRX-Inactivity timer 516, which specifies the duration of time that the wireless communication device should remain in the active state after receiving a PDCCH 514. In some examples, depending on when the PDCCH 514 is received during the PDCCH monitoring window 510, the DRX-Inactivity timer 516 may extend the DRX ON duration 504, as shown in FIG. 5. At the end of the DRX ON duration 504, the wireless communication device may again enter a sleep state or low-power state for the DRX OFF duration 506.

Prior to each PDCCH monitoring window 510 (e.g., prior to the subframe number (SFN) of the subframe at which the wireless communication device is configured to wake up), the wireless communication device may schedule and perform one or more tracking loop updates 508 during a warm-up occasion 512. For example, the wireless communication device may perform a TTL update, FTL update, PDP estimation update, and/or AGC update procedure during the warm-up occasion 512, as described above. In some examples, the wireless communication device may receive a reference signal, such as a channel state information-reference signal (CSI-RS) or a synchronization signal block (SSB), transmitted by the base station for tracking loop updates. The SSB may be transmitted within a cell with known periodicity (e.g., 20 ms). Therefore, in some examples, the warm-up occasion 512 may occur at the known SSB transmission time prior to the wake-up time for the DRX ON duration 504.

Figure 6:
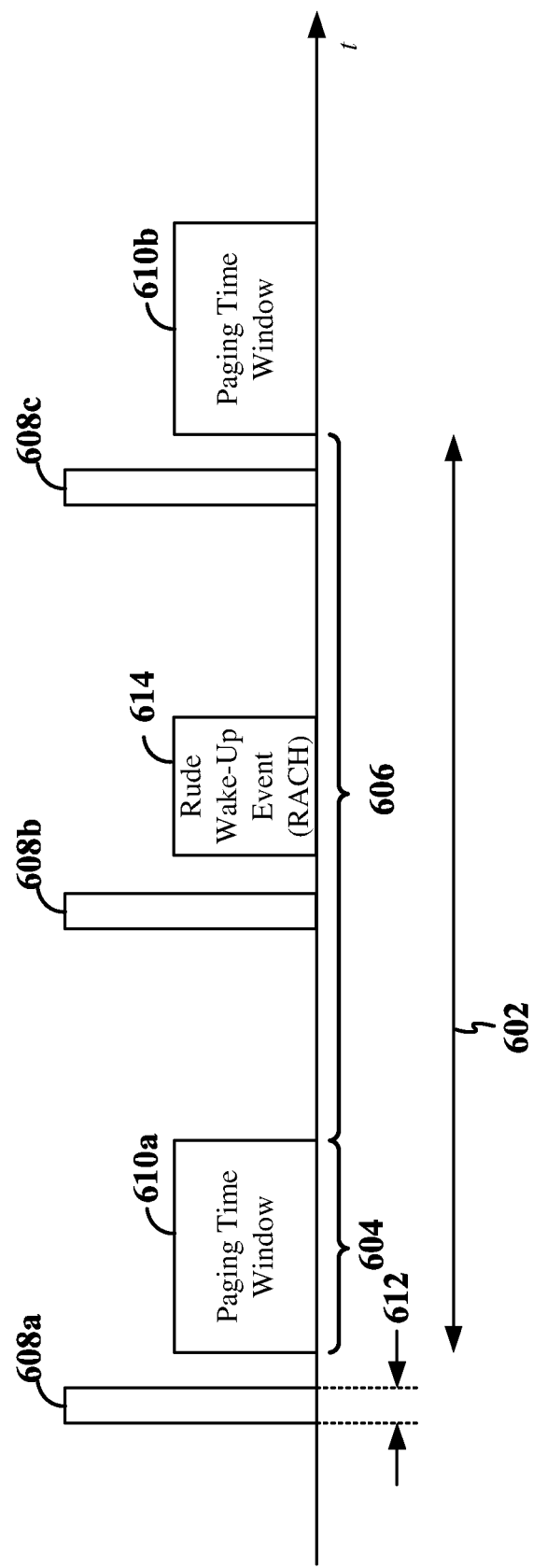
FIG. 6 is a diagram illustrating an example of a rude wake-up event during I-DRX mode according to some aspects.

FIG. 6 is a diagram illustrating an example of a rude wake-up event during I-DRX mode according to some aspects. Similar to FIG. 4, the DRX idle mode (I-DRX) is characterized by a number of consecutive DRX cycles 602 in time (t). The duration of each DRX cycle 602 may correspond, for example, to a paging cycle set by the network. Each DRX cycle 602 includes a DRX ON duration 604 corresponding to an awake period during which the wireless communication device is in an active state and a DRX OFF duration 606 corresponding to a sleep period during which the wireless communication device is in a sleep state. Each DRX ON duration 604 may include a respective paging time window 610 containing a paging occasion within which the wireless communication device may receive a paging message. In the example shown in FIG. 6, two paging time windows 610a and 610b are illustrated, for convenience. Prior to each paging time window 610a and 610b, the wireless communication device may perform respective tracking loop updates 608a and 608c within a respective warm-up occasion 612.

During the DRX OFF duration 606, data may arrive in an uplink buffer of the wireless communication device to be transmitted to the base station. In some examples, the data may be urgent data (e.g., data associated with a particular application or quality of service (QoS)) necessitating delivery to the base station prior to the next DRX ON duration 604. To facilitate transmission of the uplink data to the base station, the wireless communication device may initiate a rude wake-up event 614 to wake-up (e.g., perform a power-up operation) during the sleep period (e.g., during the DRX OFF duration 606) and transmit a random access channel (RACH) message (e.g., msg1 in a four-step RACH procedure or msgA in a two-step RACH procedure) to the network to connect to the base station (e.g., RRC connection set-up) and obtain an uplink grant for transmission of the uplink data. Prior to the rude wake-up event 614, the wireless communication device may schedule and perform one or more additional tracking loop updates 608b (e.g., TTL and/or FTL updates) during a corresponding warm-up occasion 612.

Figure 7:
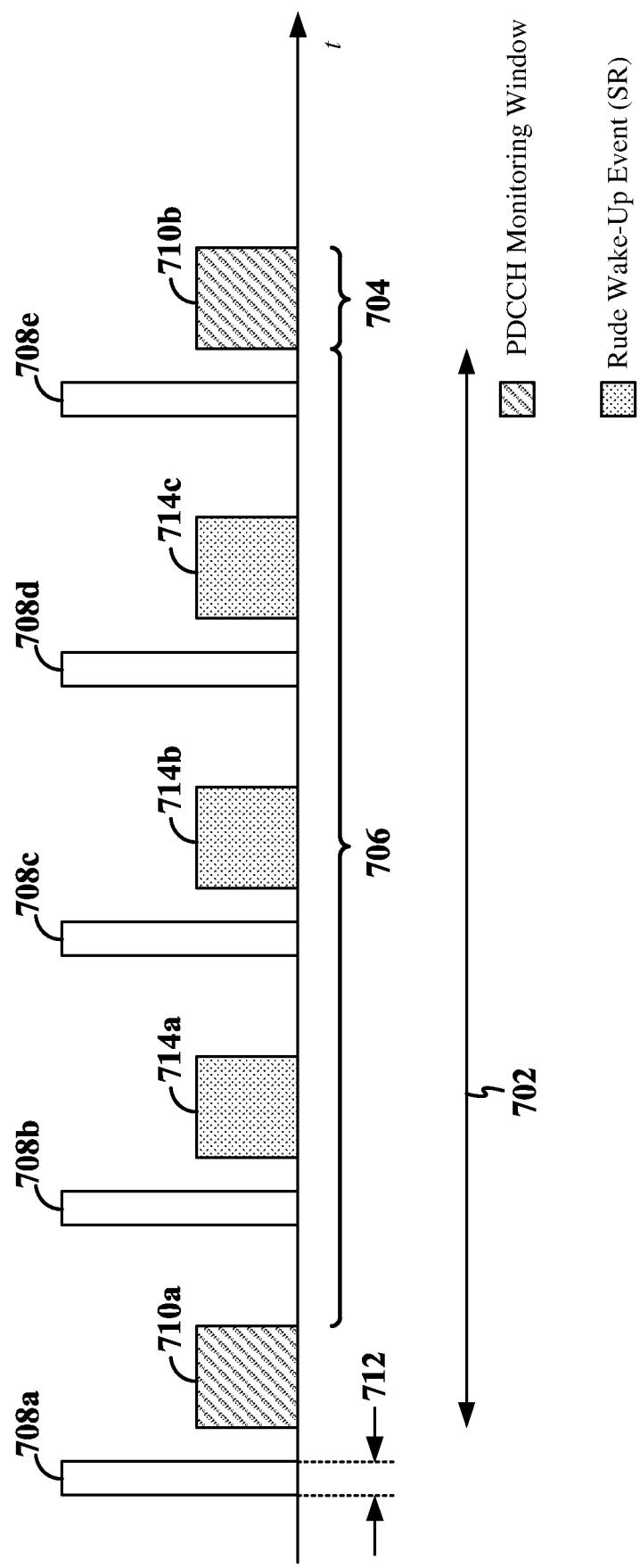
FIG. 7 is a diagram illustrating an example of rude wake-up events during C-DRX mode according to some aspects.

FIG. 7 is a diagram illustrating an example of rude wake-up events during C-DRX mode according to some aspects. Similar to FIG. 5, the DRX connected mode (C-DRX) is characterized by a number of consecutive DRX cycles 702 in time (t). The duration of each DRX cycle 702 may correspond, for example, to a long DRX cycle or a short DRX cycle, depending on the C-DRX configuration. Each DRX cycle 702 includes a DRX ON duration 704 corresponding to an awake period during which the wireless communication device is in an active state and a DRX OFF duration 706 corresponding to a sleep period during which the wireless communication device is in a sleep state. Each DRX ON duration 704 may include a respective PDCCH monitoring window within which the wireless communication device may monitor for a PDCCH from the base station that is destined for the wireless communication device. In the example shown in FIG. 7, two PDCCH monitoring windows 710a and 710b are illustrated, for convenience. Prior to each PDCCH monitoring window 710a and 710b, the wireless communication device may perform respective tracking loop updates 708a and 708e within a respective warm-up occasion 712.

During the DRX OFF duration 706, data may arrive in an uplink buffer of the wireless communication device to be transmitted to the base station. In some examples, the data may be urgent data (e.g., data associated with a particular application or quality of service (QoS)) necessitating delivery to the base station prior to the next DRX ON duration 704. To facilitate transmission of the uplink data to the base station, the wireless communication device may initiate a rude wake-up event 714a to wake-up (e.g., perform a power-up operation) during the sleep period (e.g., during the DRX OFF duration 706) and transmit a scheduling request (e.g., within UCI of a PUCCH) to the base station to obtain an uplink grant for transmission of the uplink data. Prior to the rude wake-up event 714a, the wireless communication device may schedule and perform one or more additional tracking loop updates 708b (e.g., TTL and/or FTL updates) during a corresponding warm-up occasion 712.

In some examples, the wireless communication device may perform multiple rude wake-up events 714a, 714b, and 714c during the sleep period (e.g., DRX OFF duration 706), depending on the amount and periodicity of uplink data to be transmitted. In this example, the wireless communication device may likewise perform a respective tracking loop update 708b, 708c, and 708d prior to each rude wake-up event 714a, 714b, and 714c. For example, multiple rude wake-up events 714a, 714b, and 714c may occur during a long DRX cycle.

The additional tracking loop updates 708b, 708c, and 708d performed prior to each rude wake-up event 714a, 714b, and 714c in the C-DRX mode and the additional tracking loop updates 608b performed prior to each rude wake-up event 614 in the I-DRX mode may affect both the performance and power consumption of the wireless communication device. For example, the extra warm-up tracking loop updates performed in the I-DRX mode may increase the control plane latency (e.g., the time between RACHTrigger and RRCSetupComplete) of the wireless communication device and impact the battery life of the wireless communication device. As another example, in the C-DRX mode, when there are back-to-back rude wake-up events 714a, 714b, and 714c, as shown in FIG. 7, the wireless communication device schedules extra SSBs to perform the tracking loop updates 708b, 708c, and 708d before each rude wake-up event 714a, 714b, and 714c, respectively, which may increase the Layer 1 (L1) timeline and impact the battery life of the wireless communication device. In addition, in either the I-DRX mode or C-DRX mode, the additional tracking loop updates performed prior to rude wake-up events may undesirably increase the awake time of the wireless communication device.

Therefore, in various aspects of the disclosure, the wireless communication device may adaptively or selectively perform tracking loop updates for rude wake-up events to improve performance and reduce power consumption. In an aspect, the wireless communication device may perform the one or more tracking loops when a time difference between a last tracking loop update and the warm-up occasion associated with the rude wake-up event is greater than a threshold. However, when the time difference is less than or equal to the threshold, the wireless communication device may perform the rude wake-up event without performing the one or more tracking loop updates, thus reducing the control plane latency and minimizing the awake time. In this example, the UE may utilize the last tracking loop update when performing the rude wake-up event.

In some examples, a threshold value of the threshold may be selected from a plurality of threshold values based on a cell quality mode. For example, the cell quality mode may be a cell excellent mode, a cell normal mode or a cell panic mode. The cell quality mode may be determined, for example, based on a measured signal-to-noise ratio (SNR) of a reference signal (e.g., SSB or CSI-RS) transmitted by the base station in the cell serving the wireless communication device. For example, the wireless communication device may measure the SNR of an SSB during the last tracking loop update and utilize the measured SNR to determine the cell quality mode of the cell. In some examples, the threshold value may be higher for the cell excellent mode and lower for the cell panic mode.

Figure 8:
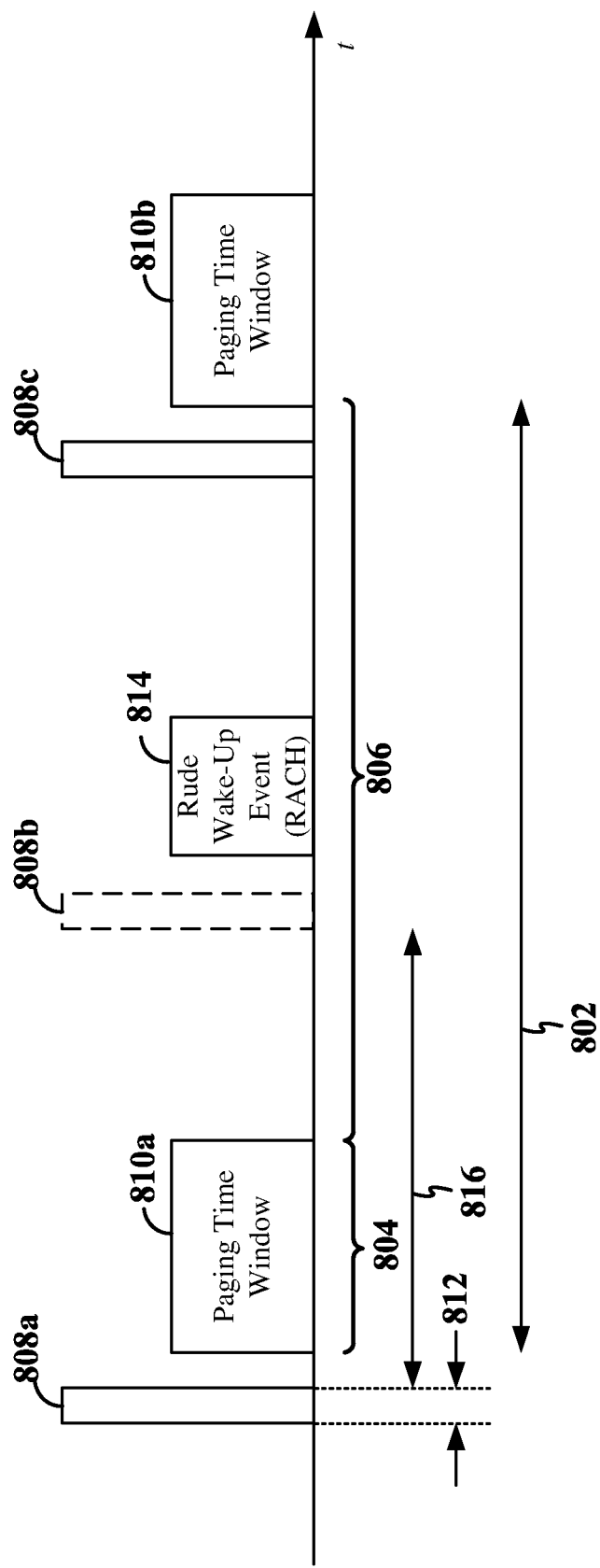
FIG. 8 is a diagram illustrating an example of adaptive tracking loop updates for rude wake-up events during I-DRX mode according to some aspects.

FIG. 8 is a diagram illustrating an example of adaptive tracking loop updates for rude wake-up events during I-DRX mode according to some aspects. Similar to FIGS. 4 and 6, the DRX idle mode (I-DRX) is characterized by a number of consecutive DRX cycles 802 in time (t). The duration of each DRX cycle 802 may correspond, for example, to a paging cycle set by the network. Each DRX cycle 802 includes a DRX ON duration 804 corresponding to an awake period during which the wireless communication device is in an active state and a DRX OFF duration 806 corresponding to a sleep period during which the wireless communication device is in a sleep state. Each DRX ON duration 804 may include a respective paging time window 810 containing a paging occasion within which the wireless communication device may receive a paging message. In the example shown in FIG. 8, two paging time windows 810a and 810b are illustrated, for convenience. Prior to each paging time window 810a and 810b, the wireless communication device may perform respective tracking loop updates 808a and 808c within a respective warm-up occasion 812.

During the DRX OFF duration 806, the wireless communication device may initiate a rude wake-up event 814 to wake-up (e.g., perform a power-up operation) during the sleep period (e.g., during the DRX OFF duration 806) and transmit a random access channel (RACH) message to the base station. Prior to the rude wake-up event 814, the wireless communication device may adaptively or selectively schedule and perform one or more additional tracking loop updates 808b (e.g., TTL and/or FTL updates) during a corresponding warm-up occasion 812. By adaptively performing tracking loop update(s), the wireless communication device may not have to perform tracking loop updates prior to the wake-up subframe number (SFN) (e.g., ON time) of each rude wake-up event 814.

In an aspect, the wireless communication device may identify a time difference 816 between a last tracking loop update 808a performed by the wireless communication device and the warm-up occasion 812 within which the additional tracking loop update(s) 808b for the rude wake-up event 814 may be performed. For example, the time difference 816 may correspond to the difference in time between an end of the last tracking loop update 808a performed and the beginning of the potential additional tracking loop update(s) 808b (e.g., ON time) for the rude wake-up event 814. The wireless communication device may then compare the time difference 816 to a threshold to determine whether to schedule and perform the additional tracking loop update(s) 808b. In some examples, the threshold may be a factory setting on the wireless communication device. For example, the threshold may be set by a 3GPP standard or specification and stored (e.g., hard-coded) on the wireless communication device. In other examples, the threshold may be configurable by the base station and transmitted to the wireless communication device.

In some examples, when the time difference 816 is greater than a threshold, the wireless communication device may continue to perform the additional tracking loop update(s) 808b during the warm-up occasion 812 prior to the rude wake-up event 814. However, when the time difference 816 is less than or equal to the threshold, the wireless communication device may perform the rude wake-up event 814 without performing the additional tracking loop update(s) 808b. In this example, the wireless communication device will not schedule or perform the one or more additional tracking loop updates 808b, and may perform the rude wake-up event 814 utilizing the last tracking loop update(s) 808a (e.g., the wireless communication device may apply the results of the last tracking loop update(s) 808a to update the tracking loop(s) for the current rude wake-up event 814). In examples in which the SSB periodicity is 20 ms, the wake-up timeline of the wireless communication device may be reduced by up to 20 ms when the wireless communication device does not schedule or perform the tracking loop update(s) 808b for the current rude wake-up event 814 (e.g., the tracking loop update(s) 808b are skipped).

In some examples, the wireless communication device may select a threshold value for the threshold from a plurality of threshold values. The wireless communication device may select the threshold value based on, for example, at least one reference signal (e.g., SSB or CSI-RS) received from a cell in wireless communication with the wireless communication device during the last tracking loop update 808a. For example, each threshold value may be associated with a respective cell quality mode of the cell. The cell quality modes may include, for example, a cell excellent mode, a cell normal mode, or a cell panic mode. The wireless communication device may determine the cell quality mode of the cell based on the at least one reference signal and select the threshold value for the threshold based on the cell quality mode. For example, the wireless communication device may measure an SNR of the at least one reference signal and determine the cell quality mode based on the at least one reference signal.

In an example, the wireless communication device may determine that the cell quality mode of the cell is cell excellent mode when the SNR is above 6 dB. In addition, the wireless communication device may determine that the cell quality mode of the cell is cell normal mode when the SNR is between −4 dB and 6 dB. Furthermore, the wireless communication device may determine that the cell quality mode is cell panic mode when the SNR is below −4 dB.

In an example, the threshold value associated with the cell excellent mode may be 320 ms, the threshold value associated with the cell normal mode may be 160 ms, and the threshold value associated with the cell panic mode may be 80 ms. Thus, when the wireless communication device determines that the cell quality mode is cell normal mode (e.g., based on a measured SNR of at least one reference signal during the last tracking loop update 808a), the wireless communication device may perform the rude wake-up event 814 without performing one or more additional tracking loop updates 808b when the time difference 816 between completion of the last tracking loop update(s) 808a and the scheduled ON time to perform the additional tracking loop updates 808b is less than or equal to 160 ms. As a result, when the last tracking loop update 808a occurred within 160 ms from the next scheduled ON time for the warm-up occasion 812 associated with the rude wake-up event 814, the wireless communication device will not perform the additional tracking loop update(s) 808b. The wireless communication device may then utilize the result from the last tracking loop update 808a to update the tracking loops (e.g., TTL and/or FTL) for the rude wake-up event 814.

Figure 9:
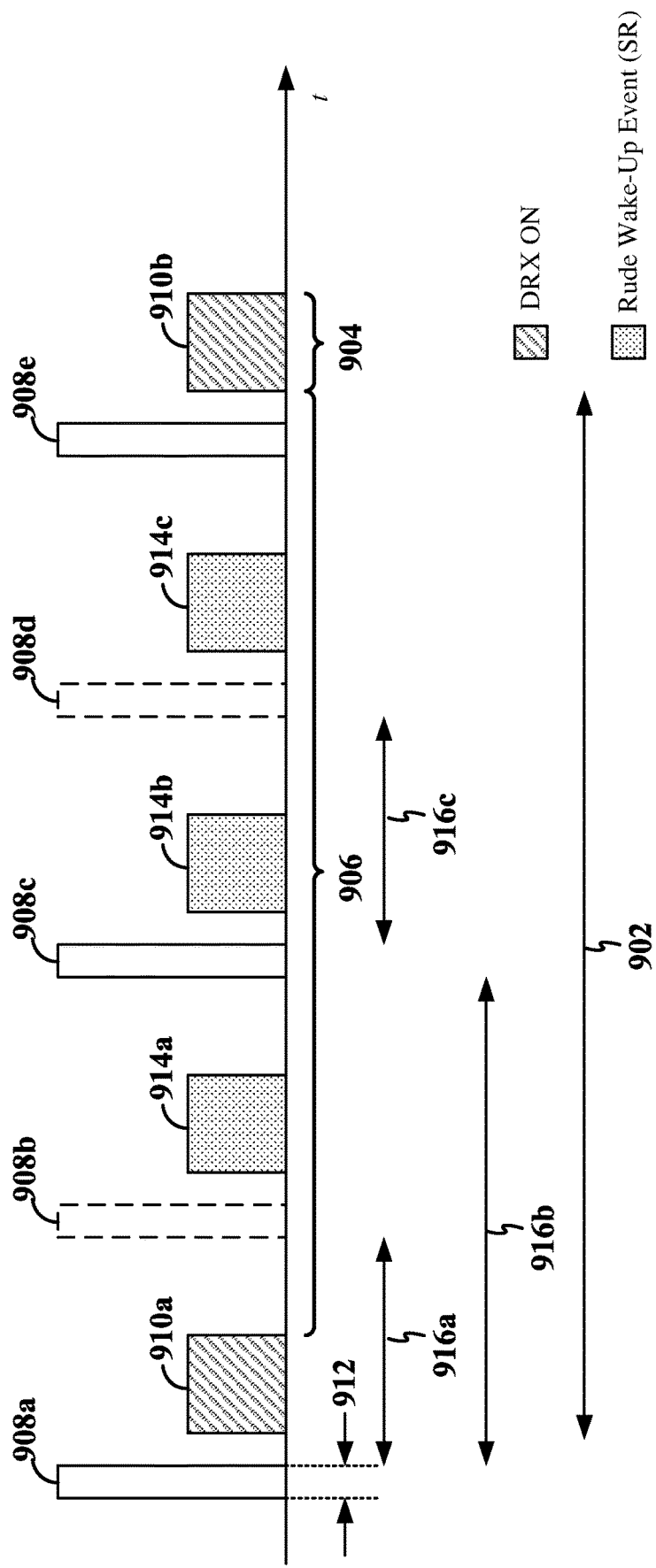
FIG. 9 is a diagram illustrating an example of adaptive tracking loop updates for rude wake-up events during C-DRX mode according to some aspects.

FIG. 9 is a diagram illustrating an example of adaptive tracking loop updates for rude wake-up events during C-DRX mode according to some aspects. Similar to FIGS. 5 and 7, the DRX connected mode (C-DRX) is characterized by a number of consecutive DRX cycles 902 in time (t). The duration of each DRX cycle 902 may correspond, for example, to a long DRX cycle or a short DRX cycle, depending on the C-DRX configuration. Each DRX cycle 902 includes a DRX ON duration 904 corresponding to an awake period during which the wireless communication device is in an active state and a DRX OFF duration 906 corresponding to a sleep period during which the wireless communication device is in a sleep state. Each DRX ON duration 904 may include a respective PDCCH monitoring window within which the wireless communication device may monitor for a PDCCH from the base station that is destined for the wireless communication device. In the example shown in FIG. 9, two PDCCH monitoring windows 910a and 910b are illustrated, for convenience. Prior to each PDCCH monitoring window 910a and 910b, the wireless communication device may perform respective tracking loop updates 908a and 908e within a respective warm-up occasion 912.

During the DRX OFF duration 906, the wireless communication device may initiate one or more rude wake-up events, three of which 914a, 914b, and 914c are shown for convenience. During each rude wake-up event 914a, 914b, and 914c, the wireless communication device may suddenly wake-up (e.g., perform a power-up operation) from sleep during the sleep period (e.g., during the DRX OFF duration 906) to transmit, for example, a scheduling request to the base station. Prior to each rude wake-up event 914a, 914b, and 914c, the wireless communication device may adaptively or selectively schedule and perform one or more additional tracking loop updates 908b, 908c, and 908d (e.g., TTL and/or FTL updates) during a corresponding warm-up occasion 912. By adaptively performing tracking loop update(s), the wireless communication device may not have to perform tracking loop updates prior to the wake-up subframe number (SFN) (e.g., ON time) of each rude wake-up event 914a, 914b, 914c.

In the example shown in FIG. 9, for the first rude wake-up event 914a, the wireless communication device may determine that a time difference 916a between the last tracking loop update 908a and the warm-up occasion 912 associated with the first rude wake-up event 914*a* is less than or equal to a threshold. As a result, the wireless communication device may perform the first rude wake-up event 914*a* without performing the additional tracking loop update(s) 908*b*. Thus, the wireless communication device may skip the additional tracking loop update(s) 908*b* and perform the first rude wake-up event 914*a* utilizing the last tracking loop update(s) 908*a* (e.g., the wireless communication device may apply the results of the last tracking loop update(s) 908*a* to update the tracking loop(s) for the first rude wake-up event 914*a*).

For the second rude wake-up event 914*b*, since tracking loop update(s) were not performed for the first rude wake-up event 914*a*, the wireless communication device may consider the last tracking loop update(s) relative to the second rude wake-up event 914*b* to be the tracking loop update(s) 908*a* performed for the first PDDCH monitoring window 910*a*. In this example, the wireless communication device may determine that a time difference 916*b* between the last tracking loop update(s) 908*b* and the warm-up occasion 912 associated with the second rude wake-up event 914*b* is greater than the threshold. As a result, the wireless communication device may schedule and perform the one or more tracking loop updates 908*c* during the corresponding warm-up occasion 912 prior to performing the second rude wake-up event 914*b* to update the tracking loops (e.g., TTL and/or FTL) for the second rude wake-up event 914*b*.

For the third rude wake-up event 914*c*, since the tracking loop update(s) were performed for the second rude wake-up event 914*b*, the wireless communication device may consider the last tracking loop update(s) relative to the third rude wake-up event to be the tracking loop update(s) 908*c* performed for the second rude wake-up event 914*b*. In this example, the wireless communication device may determine that a time difference 916*c* between the last tracking loop update(s) 908*c* and the warm-up occasion 912 associated with the third rude wake-up event 914*c* is less than or equal to the threshold. As a result, the wireless communication device may perform the third rude wake-up event 914*c* without performing the additional tracking loop update(s) 908*d*. Thus, the wireless communication device may skip the additional tracking loop update(s) 908*d* and perform the third rude wake-up event 914*c* utilizing the last tracking loop update(s) 908*c* (e.g., the wireless communication device may apply the results of the last tracking loop update(s) 908*c* to update the tracking loop(s) for the third rude wake-up event 914*c*).

In the example shown in FIG. 9, the wireless communication device may select a threshold value for the threshold from a plurality of threshold values based on a determined cell quality mode of the cell. For example, the wireless communication device may select from a first threshold value associated with a cell excellent mode, a second threshold value associated with a cell normal mode, and a third threshold value associated with a cell panic mode.

Figure 10:
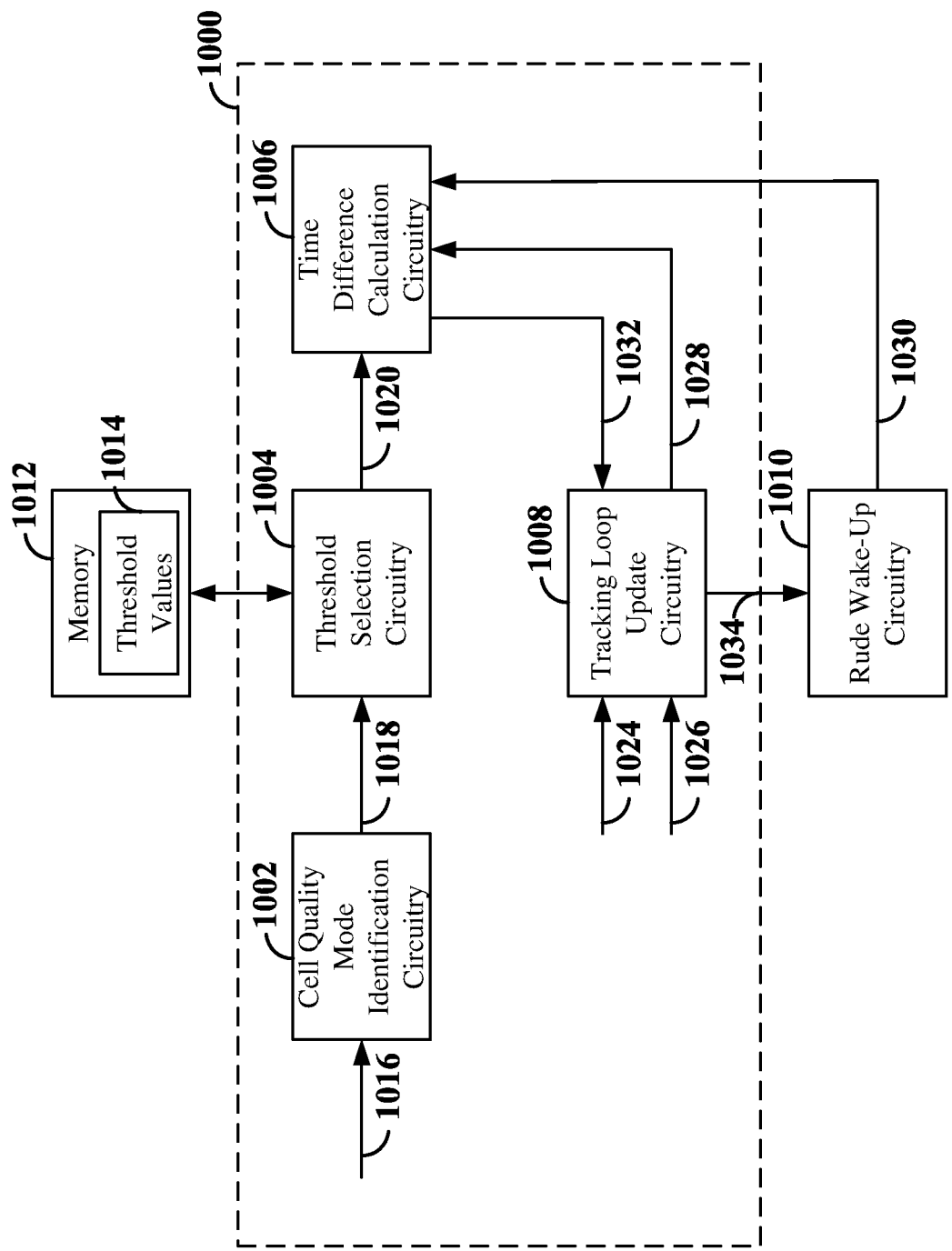
FIG. 10 is block diagram illustrating an example of tracking loop update adaptation circuitry within a wireless communication device according to some aspects.

FIG. 10 is block diagram illustrating an example of tracking loop update adaptation circuitry 1000 within a wireless communication device (e.g., a UE) according to some aspects. The tracking loop update adaptation circuitry 1000 may include cell quality mode identification circuitry 1002, threshold selection circuitry 1004, time difference calculation circuitry 1006, and tracking loop update circuitry 1008. The tracking loop update adaptation circuitry 1000 may further be coupled to rude wake-up circuitry 1010 and a memory 1012 storing one or more threshold values 1014.

In an example, the tracking loop update circuitry 1008 may be configured to update at least one tracking loop (e.g., TTL and/or FTL) during a warm-up occasion prior to a scheduled subframe at which the wireless communication device may wake-up during I-DRX mode or C-DRX mode based on DRX parameters 1024 received from the network (e.g., a base station serving the wireless communication device). The DRX parameters 1024 may indicate a DRX cycle between DRX ON durations and DRX OFF durations. The tracking loop update circuitry 1008 may determine the warm-up occasion for each scheduled DRX ON duration based on the DRX parameters 1024. For example, the tracking loop update circuitry 1008 may determine an ON time for a warm-up occasion to perform tracking loop updates based on the DRX parameters 1024. The tracking loop update circuitry 1008 may further be configured to receive at least one reference signal 1026 from a cell (e.g., base station) in wireless communication with the wireless communication device and to utilize the at least one reference signal 1026 in updating one or more tracking loops.

The rude wake-up circuitry 1010 may be configured to trigger a rude wake-up of the wireless communication device during a sleep period (e.g., DRX OFF duration) of the wireless communication device to perform a rude wake-up event. In I-DRX mode, the rude wake-up event may include the transmission of a RACH message (e.g., msg1 or msgA) to the base station. In C-DRX mode, the rude wake-up event may include the transmission of a scheduling request. The rude wake-up circuitry 1010 may further be configured to schedule a rude wake-up event time to perform the rude wake-up event. For example, the scheduled rude wake-up event time may correspond to a subframe (e.g., SFN) at which the rude wake-up event may occur (e.g., the SFN during which the wireless communication device transitions to an active or ON state to perform the rude wake-up event).

The cell quality mode identification circuitry 1002 may be configured to obtain a measurement 1016 of at least one reference signal (e.g., an SSB or CSI-RS). The measurement 1016 may be, for example, an SNR measurement of the at least one reference signal. In some examples, the SNR measurement 1016 may be obtained during a tracking loop update performed by the tracking loop update circuitry 1008. The cell quality mode identification circuitry 1002 may further be configured to determine a cell quality mode 1018 based on the SNR measurement 1016. In some examples, the determined cell quality mode 1018 may be selected from a cell excellent mode, a cell normal mode, or a cell panic mode. For example, the cell quality mode identification circuitry 1002 may select the cell excellent mode when the SNR measurement 1016 is above (greater than) 6 dB, the cell normal mode when the SNR measurement 1016 is between −4 dB and 6 dB, and the cell panic mode when the SNR measurement 1016 is below (less than) −4 dB. In some examples, the cell quality mode identification circuitry 1002 may be configured to receive the measurement 1016 from the tracking loop update circuitry 1008 or other circuitry (not shown) during or after performance of the last tracking loop update.

The threshold selection circuitry 1004 may be configured to access the memory 1012 to retrieve a threshold value 1014 associated with the cell quality mode 1018 and utilize the retrieved threshold value 1014 for a threshold 1020 to be used in adaptively performing tracking loop updates. For example, the threshold selection circuitry 1004 may retrieve a threshold value 1014 of 320 ms when the cell quality mode 1018 is cell excellent mode, a threshold value 1014 of 160 ms when the cell quality mode 1018 is cell normal mode, and a threshold value 1014 of 80 ms when the cell quality mode 1018 is cell panic mode.

The time difference calculation circuitry 1006 may be configured to receive the threshold 1020 from the threshold selection circuitry 1004. The time difference calculation circuitry 1006 may further be configured to receive a last tracking loop update time 1028 of a last tracking loop update performed by the tracking loop update circuitry 1008. For example, the tracking loop update circuitry 1008 may be configured to identify the last tracking loop update time 1028 as a time at which the tracking loop update circuitry 1008 completed the last tracking loop update(s). The last tracking loop update may have been performed prior to a DRX ON duration or prior to a rude wake-up event.

The time difference calculation circuitry 1006 may further be configured to receive a scheduled tracking loop update time 1030 for a rude wake-up event to be performed from the rude wake-up circuitry 1010. For example, the rude wake-up circuitry 1010 may further be configured to determine the scheduled tracking loop update time 1030 based on the scheduled rude wake-up event time. In an example, the scheduled tracking loop update time 1030 may correspond to a time at which the wireless communication device may power-up (e.g., an ON time) to perform one or more tracking loop updates during a warm-up occasion prior to the scheduled rude wake-up event time (e.g., prior to performing the rude wake-up event).

The time difference calculation circuitry 1006 may further be configured to determine a time difference between the scheduled tracking loop update time 1030 for the rude wake-up event and the last tracking loop update time 1028 of the last tracking loop update. The time difference calculation circuitry 1006 may then be configured to compare the time difference to the threshold 1020 and generate and provide an indication (or instruction) 1032 to the tracking loop update circuitry 1008 indicating whether the tracking loop update circuitry 1008 may perform the scheduled tracking loop update(s) for the rude wake-up event. For example, when the time difference is greater than the threshold 1020, the indication 1032 provided to the tracking loop update circuitry 1008 may indicate to perform the scheduled tracking loop update(s) within the corresponding warm-up occasion for the rude wake-up event. As another example, when the time difference is less than or equal to the threshold 1020, the indication 1032 provided to the tracking loop update circuitry 1008 may indicate to not perform (e.g., skip) the scheduled tracking loop update(s) for the rude wake-up event.

The tracking loop update circuitry 1008 may further be configured to provide a result 1034 of the tracking loop update(s) to the rude wake-up circuitry 1010 for use in performing the rude wake-up event. In examples in which the indication 1032 provided from the time difference calculation circuitry 1006 to the tracking loop update circuitry 1008 indicates to not perform the scheduled tracking loop update(s) for the rude wake-up event, the result 1034 provided by the tracking loop update circuitry 1008 to the rude wake-up circuitry 1010 may include the last result from the last (previous) tracking loop update(s) performed by the tracking loop update circuitry 1008. Otherwise, the result 1034 may include the current result from the current (scheduled) tracking loop update(s) performed by the tracking loop update circuitry 1008 for the rude wake-up event.

Figure 11:
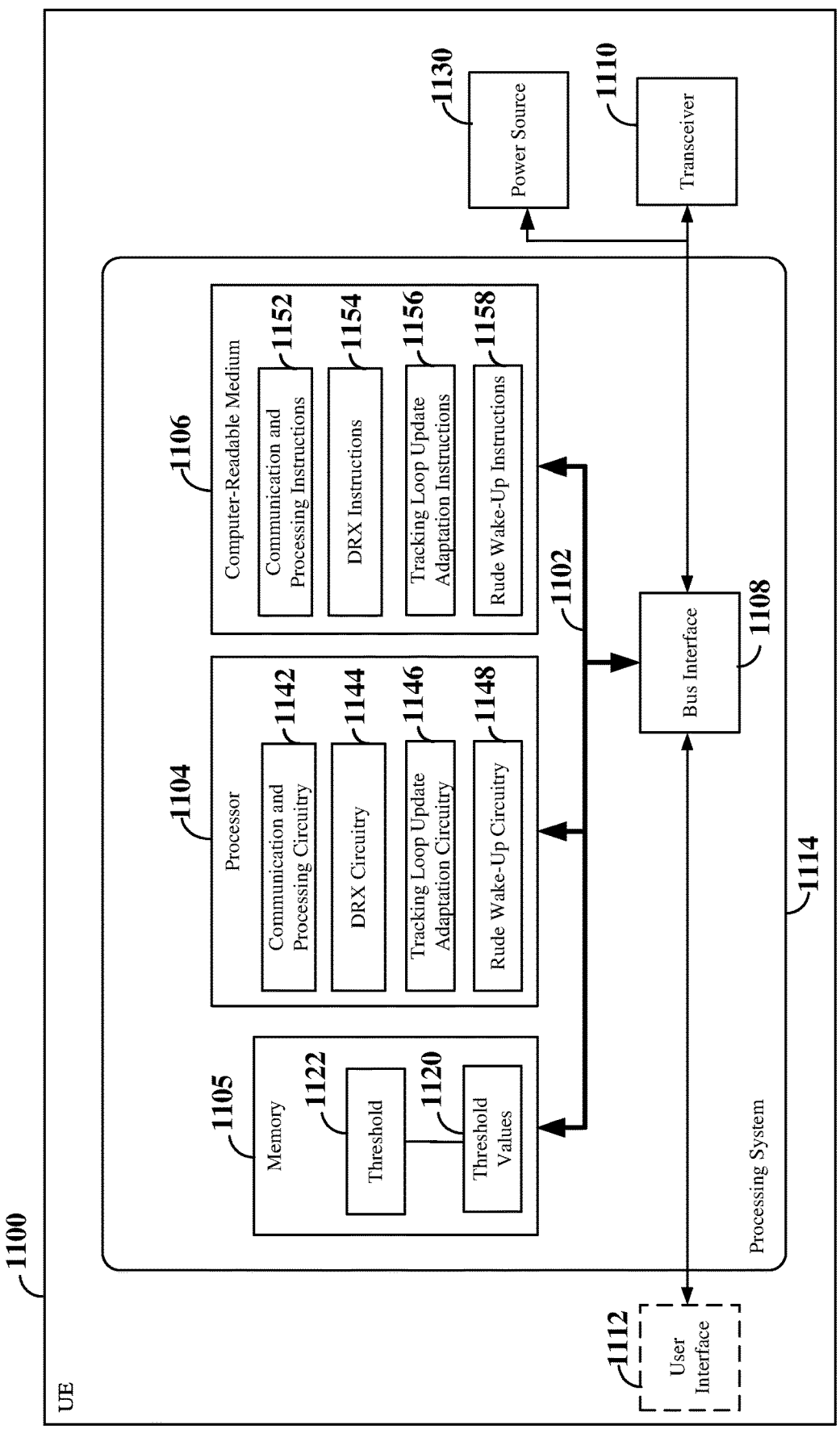
FIG. 11 is a block diagram illustrating an example of a hardware implementation for a wireless communication device employing a processing system according to some aspects.

FIG. 11 is a conceptual diagram illustrating an example of a hardware implementation for an exemplary wireless communication device 1100 employing a processing system 1114. For example, the wireless communication device 1100 may be a UE or other scheduled entity as illustrated in any one or more of FIGS. 1, 2, 5, 8 and/or 9.

The wireless communication device 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1100 may be configured to perform any one or more of the functions described herein. That is, the processor 1104, as utilized in a wireless communication device 1100, may be used to implement any one or more of the processes described below in connection with FIG. 11.

The processor 1104 may in some instances be implemented via a baseband or modem chip and in other implementations, the processor 1104 may itself comprise a number of devices distinct and different from a baseband or modem chip (e.g., in such scenarios is may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a means for communicating with various other apparatus over a transmission medium (e.g., air interface). Depending on the nature of the wireless communication device 1100 (e.g., IoT device, enhanced mobile broadband (eMBB) device, ultra-reliable low-latency communication (URLLC) device, reduced capability device, etc.), an optional user interface 1112 (e.g., keypad, display, speaker, microphone, joystick) may also be provided and is connected via bus interface 1108 to bus 1102.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. In some examples, the computer-readable medium 1106 may be part of the memory 1105. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include communication and processing circuitry 1142, configured to communicate with a base station (e.g., gNB, eNB, or other TRP) or cell (e.g., TRP) served by a base station. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1142 may be configured to receive and process at least one reference signal from the base station during, for example, a tracking loop update procedure. The communication and processing circuitry 1142 may further be configured to receive a paging message from the base station during a DRX ON duration in an I-DRX mode or a PDCCH from the base station during a DRX ON duration in a C-DRX mode. The communication and processing circuitry 1142 may further be configured to transmit a RACH message for a rude wake-up event during the sleep period of an I-DRX mode or a scheduling request for a rude wake-up event during the sleep period of a C-DRX mode. The communication and processing circuitry 1142 may further be configured to execute communication and processing instructions (software) 1152 stored in the computer-readable medium 1106 to implement one or more of the functions described herein.

The processor 1104 may further include DRX circuitry 1144, configured to implement an I-DRX mode or C-DRX mode on the wireless communication device 1100. In I-DRX mode, the DRX circuitry 1144 can determine a DRX cycle including a DRX ON duration and a DRX OFF duration. The DRX cycle may be determined, for example, based on DRX parameters received from the base station. Upon entering the DRX ON duration at a system time corresponding to a start of the DRX ON duration, the DRX circuitry 1144 may be configured to wake-up the wireless communication device 1100 to enter an active state (e.g., awake state). For example, the DRX circuitry 1144 may be configured to control a power source 1130 to perform a power-up operation of one or more components of the wireless communication device 1100, such as the transceiver 1110, to enable monitoring and reception of a paging message in the DRX ON duration. At the end of the DRX ON duration at a system time corresponding to a start of the DRX OFF duration, the DRX circuitry 1144 may further be configured to control the power source 1130 to perform a power-down operation of the one or more components of the wireless communication device 1100 to enter a sleep state.

In C-DRX mode, the DRX circuitry 1144 can determine a DRX cycle including a DRX ON duration and a DRX OFF duration. The DRX cycle may be determined, for example, based on DRX parameters received from the base station. Upon entering the DRX ON duration at a system time corresponding to a start of the DRX ON duration, the DRX circuitry 1144 may be configured to wake-up the wireless communication device 1100 to enter an active state (e.g., awake state). For example, the DRX circuitry 1144 may be configured to control the power source 1130 to perform a power-up operation of one or more components of the wireless communication device 1100, such as the transceiver 1110, to enable monitoring and reception of a PDCCH in the DRX ON duration. At the end of the DRX ON duration at a system time corresponding to a start of the DRX OFF duration, the DRX circuitry 1144 may further be configured to control the power source 1130 to perform a power-down operation of the one or more components of the wireless communication device 1100 to enter a sleep state. The DRX circuitry 1144 may further be configured to execute DRX instructions (software) 1154 stored in the computer-readable medium 1106 to implement one or more of the functions described herein.

The processor 1104 may further include tracking loop update adaptation circuitry 1146, configured to adaptively perform one or more tracking loop updates. In some examples, the tracking loop update adaptation circuitry 1146 may correspond to the tracking loop update adaptation circuitry 1000 shown in FIG. 10. In some examples, the tracking loop update adaptation circuitry 1146 may be configured to perform one or more tracking loop update(s) during a warm-up occasion prior to an ON time (e.g., starting SFN) of a DRX ON duration of a DRX cycle in I-DRX mode or C-DRX mode. The tracking loop update adaptation circuitry 1146 may further be configured to perform one or more tracking loop update(s) during a warm-up occasion prior to an ON time (e.g., starting SFN) of a rude wake-up event performed during a sleep period (e.g., OFF duration) of a DRX cycle in I-DRX mode or C-DRX mode. In some examples, the tracking loop update(s) may include at least one of a time tracking loop (TTL) or a frequency tracking loop (FTL).

In some examples, the tracking loop update adaptation circuitry 1146 may be configured to receive at least one reference signal from the cell (e.g., base station) in wireless communication with the wireless communication device 1100. The at least one reference signal may include, for example, an SSB or CSI-RS. The tracking loop update adaptation circuitry 1146 may be configured to utilize the at least one reference to perform the one or more tracking loop update(s).

The tracking loop update adaptation circuitry 1146 may further be configured to identify (e.g., calculate) a time difference between a last tracking loop update and a warm-up occasion associated with a rude wake-up event. The tracking loop update adaptation circuitry 1146 may further be configured to compare the time difference with a threshold 1122, which may be stored for example in memory 1105. For example, the threshold 1122 may be pre-configured on the wireless communication device (e.g., a factory setting on the wireless communication device). When the time difference is less than the threshold 1122, the tracking loop update adaptation circuitry 1146 may be configured to not perform (e.g., skip) the tracking loop update(s) for the rude wake-up event. When the time difference is greater than or equal to the threshold 1122, the tracking loop update adaptation circuitry 1146 may be configured to perform the one or more tracking loop update(s) during the warm-up occasion prior to the performance of the rude wake-up event.

In some examples, the tracking loop update adaptation circuitry 1146 may be configured to select a threshold value 1120 for the threshold 1122 from a plurality of threshold values 1120 stored, for example, in memory 1105. For example, the threshold values 1120 may be pre-configured on the wireless communication device (e.g., a factory setting on the wireless communication device). In some examples, the tracking loop update adaptation circuitry 1146 may be configured to select the threshold value 1120 based on the at least one reference signal received from the cell during the last tracking loop update. For example, the tracking loop update adaptation circuitry 1146 may be configured to determine a cell quality mode of the cell based on the at least one reference signal and select the threshold value 1120 for the threshold 1122 based on the cell quality mode. In some examples, the tracking loop update adaptation circuitry 1146 may be configured to obtain an SNR of the at least one reference signal received during the last tracking loop update and to determine the cell quality mode based on the SNR. For example, the cell quality mode may be one of a cell excellent mode, a cell normal mode, or a cell panic mode. The tracking loop update adaptation circuitry 1146 may further be configured to execute tracking loop adaptation instructions (software) 1156 stored in the computer-readable medium 1106 to implement one or more of the functions described herein.

The processor 1104 may further include rude wake-up circuitry 1148, configured to trigger a rude wake-up of the wireless communication device to transition the wireless communication device to an active state (e.g., awake state) during the sleep period (e.g., DRX OFF duration) of the DRX cycle. For example, the rude wake-up circuitry 1148 may be configured to control the power source 1130 to perform a power-up operation of one or more components of the wireless communication device 1100, such as the transceiver 1110, to enable the rude wake-up circuitry 1148 to operate in conjunction with the communication and processing circuitry 1142 and transceiver 1110 to perform a rude wake-up event. In an example, the rude wake-up event may include transmitting a RACH message to the cell to transition to an RRC connected mode when the wireless communication device is in an I-DRX mode. As another example, the rude wake-up event may include transmitting a scheduling request to the cell when the wireless communication device is in a C-DRX mode. In some examples, the rude wake-up circuitry 1148 may monitor an uplink buffer (not shown) to determine when to trigger the rude wake-up event.

In some examples, the rude wake-up circuitry 1148 may be configured to utilize either a current result of a current tracking loop update associated with the rude wake-up event performed by the tracking loop update adaptation circuitry 1146 or a previous result of the last tracking loop update associated with either a DRX ON duration or a previous rude wake-up event performed by the tracking loop update adaptation circuitry 1146 to perform the rude wake-up event. The rude wake-up circuitry 1148 may further be configured to execute rude wake-up instructions (software) 1158 stored in the computer-readable medium 1106 to implement one or more of the functions described herein.

Figure 12:
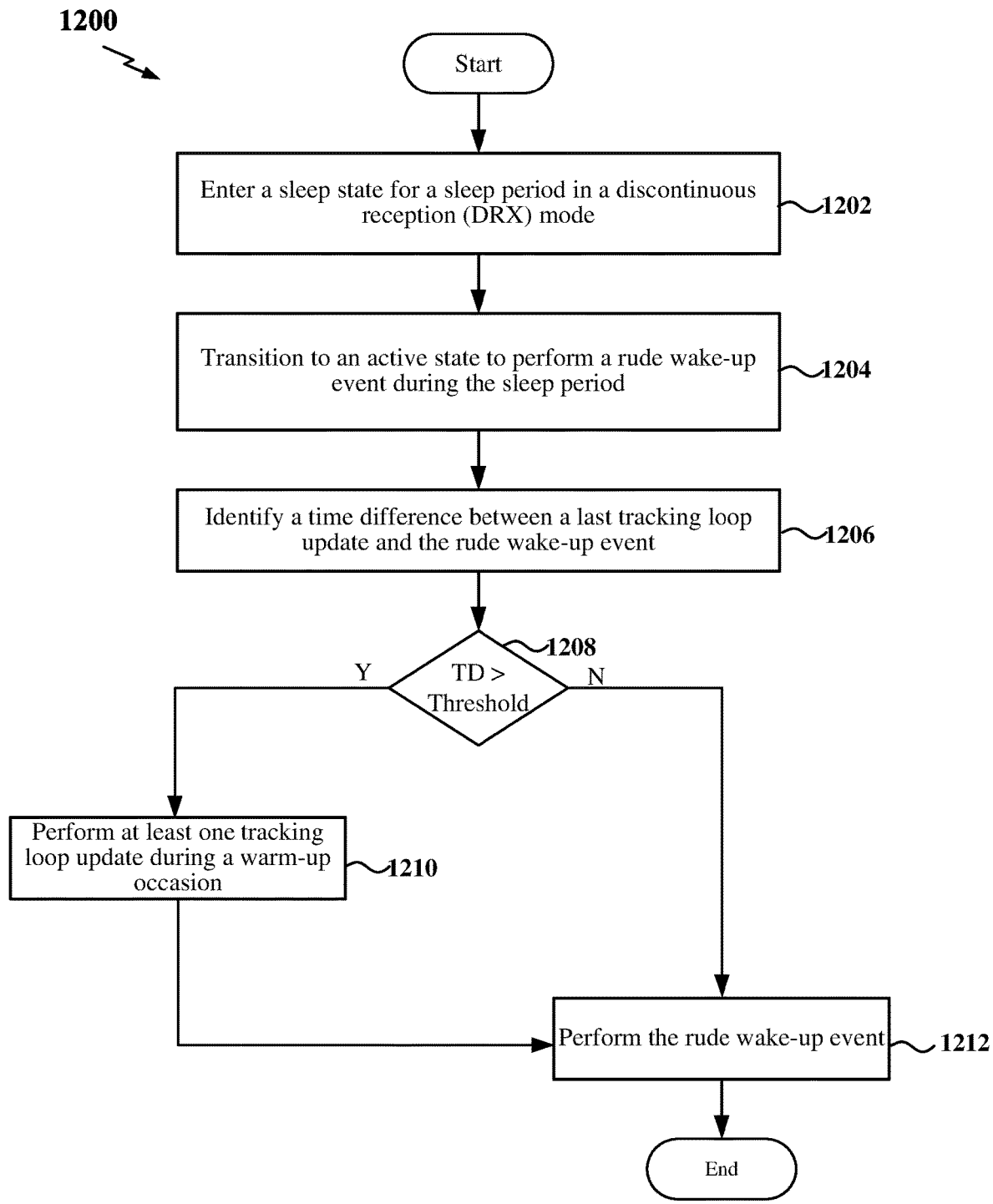
FIG. 12 is a flow chart of an exemplary method for adaptive tracking loop updates in a wireless communication device according to some aspects.

FIG. 12 is a flow chart 1200 of an exemplary method for adaptive tracking loop updates in a wireless communication device according to some aspects. As described below, some or all illustrated features may be omitted in a particular implementation within the scope of the present disclosure, and some illustrated features may not be required for implementation of all examples. In some examples, the method may be performed by the wireless communication device (e.g., UE) 1100, as described above and illustrated in FIG. 11, by a processor or processing system, or by any suitable means for carrying out the described functions.

At block 1202, the wireless communication device may enter a sleep state for a sleep period in a discontinuous reception (DRX) mode. In some examples, the DRX mode may be an I-DRX mode or a C-DRX mode. For example, the DRX circuitry 1144 shown and described above in connection with FIG. 11 may provide a means to enter the sleep state.

At block 1204, the wireless communication device may transition to an active state (e.g., awake state) to perform a rude wake-up event during the sleep period. In some examples, the rude wake-up event may include transmitting a random access channel (RACH) message (e.g., msg1 or msgA) to a cell in wireless communication with the wireless communication device to transition to a radio resource control (RRC) connected mode in response to the DRX mode including the I-DRX mode. In other examples, the rude wake-up event may include transmitting a scheduling request to the cell in response to the DRX mode including the C-DRX mode. For example, the rude wake-up circuitry 1148 shown and described above in connection with FIG. 11 may provide a means to transition the wireless communication device to the active state.

At block 1206, the wireless communication device may identify a time difference between a last tracking loop update and the rude wake-up event. For example, the tracking loop update adaptation circuitry 1146 shown and described above in connection with FIG. 11 may provide a means to identify the time difference.

At block 1208, the wireless communication device may determine whether the time difference is greater than a threshold. In some examples, the threshold may be a factory setting on the wireless communication device. For example, the tracking loop update adaptation circuitry 1146 shown and described above in connection with FIG. 11 may determine whether the time difference is greater than the threshold.

In response to the time difference being greater than the threshold (Y branch of block 1208), at block 1210, the wireless communication device may perform at least one tracking loop update during a warm-up occasion associated with the rude wake-up event. In some examples, the at least one tracking loop update may include at least one of a time tracking loop (TTL) update or a frequency tracking loop (FTL) update. In some examples, the wireless communication device may receive at least one reference signal from a cell in wireless communication with the wireless communication device and utilize the at least one reference signal to perform the at least one tracking loop update. In some examples, the at least one reference signal includes a synchronization signal block (SSB) or a channel state information reference signal (CSI-RS). For example, the tracking loop update adaptation circuitry 1146 shown and described above in connection with FIG. 11 may provide a means to perform at least one tracking loop update during the warm-up occasion associated with the rude wake-up event.

At block 1212, the wireless communication device may then perform the rude wake-up event. For example, the wireless communication device may transmit the RACH message in I-DRX mode or the scheduling request in C-DRX mode. In this example, the wireless communication device may perform the rude wake-up event utilizing the tracking loop update(s) performed at block 1210. For example, the rude wake-up circuitry 1148 shown and described above in connection with FIG. 11 may provide a means to perform the rude wake-up event.

In response to the time difference being less than or equal to the threshold (N branch of block 1208), at block 1212, the wireless communication device may perform the rude wake-up event without performing the at least one tracking loop update at block 1210. In this example, the wireless communication device may perform the rude wake-up event utilizing the last tracking loop update. For example, the rude wake-up circuitry 1148 shown and described above in connection with FIG. 11 may provide a means to perform the rude wake-up event without performing the at least one tracking loop update.

Figure 13:
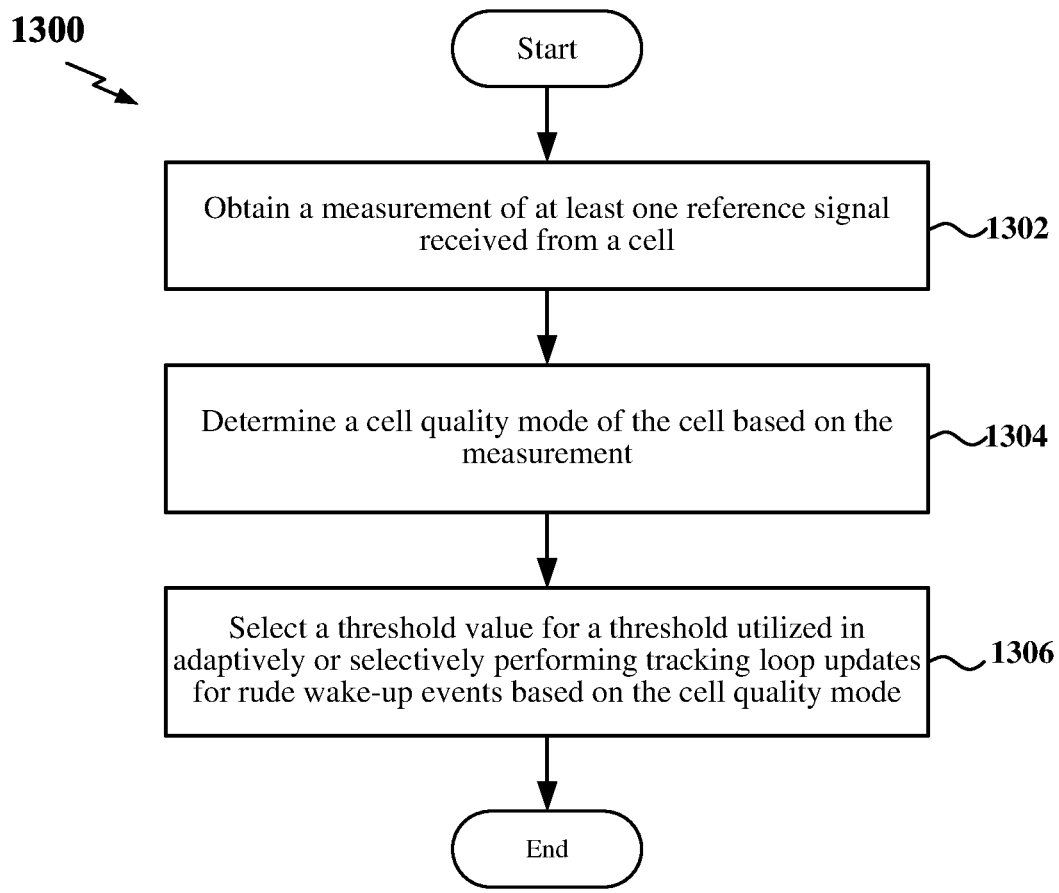
FIG. 13 is a flow chart of an exemplary method for selecting a threshold value to perform adaptive tracking loop updates in a wireless communication device according to some aspects.

FIG. 13 is a flow chart 1300 of an exemplary method for selecting a threshold value to perform adaptive tracking loop updates in a wireless communication device according to some aspects. As described below, some or all illustrated features may be omitted in a particular implementation within the scope of the present disclosure, and some illustrated features may not be required for implementation of all examples. In some examples, the method may be performed by the wireless communication device (e.g., UE) 1100, as described above and illustrated in FIG. 11, by a processor or processing system, or by any suitable means for carrying out the described functions.

At block 1302, the wireless communication device may obtain a measurement of at least one reference signal received from a cell. In some examples, the measurement is a signal-to-noise ratio (SNR) measurement. In some examples, the at least one reference signal may be received during a last tracking loop update performed by the wireless communication device. For example, the at least one reference signal may include an SSB or CSI-RS. For example, the tracking loop update adaptation circuitry 1146 shown and described above in connection with FIG. 11 may provide a means to obtain the measurement.

At block 1304, the wireless communication device may determine a cell quality mode of the cell based on the measurement. In some examples, the cell quality mode may include a cell excellent mode, a cell normal mode, or a cell panic mode. For example, the tracking loop update adaptation circuitry 1146 shown and described above in connection with FIG. 11 may provide a means to determine the cell quality mode of the cell.

At block 1306, the wireless communication device may select a threshold value for a threshold utilized in adaptively or selectively performing tracking loop updates for rude wake-up events based on the cell quality mode. In some examples, the threshold value may be selected from a plurality of threshold values, each associated with one of the cell quality modes. For example, the tracking loop update adaptation circuitry 1146 shown and described above in connection with FIG. 11 may provide a means to select the threshold value for the threshold.

In one configuration, the wireless communication device 1100 includes means for adaptively performing tracking loop updates as described in the present disclosure. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable medium 1106, or any other suitable apparatus or means described in any one of the FIGS. 1, 2 and/or 10, and utilizing, for example, the processes and/or algorithms described herein in relation to FIGS. 12 and 13.

The following provides an overview of examples of the present disclosure.

Example 1: A method for wireless communication at a user equipment (UE), the method comprising: entering a sleep state for a sleep period in a discontinuous reception (DRX) mode; transitioning to an active state to perform a rude wake-up event during the sleep period; identifying a time difference between a last tracking loop update and a warm-up occasion associated with the rude wake-up event; performing at least one tracking loop update during the warm-up occasion prior to performing the rude wake-up event in response to the time difference being greater than a threshold; and performing the rude wake-up event without performing the at least one tracking loop update in response to the time difference being less than or equal to the threshold.

Example 2: The method of example 1, wherein the performing the at least one tracking loop update further comprises: performing at least one of a time tracking loop (TTL) update or a frequency tracking loop (FTL) update.

Example 3: The method of example 1 or 2, wherein the performing the at least one tracking loop update further comprises: receiving at least one reference signal from a cell in wireless communication with the UE, wherein the at least one reference signal comprises a synchronization signal block (SSB) or a channel state information reference signal (CSI-RS); and utilizing the at least one reference signal to perform the at least one tracking loop update.

Example 4: The method of any of examples 1 through 3, further comprising: selecting a threshold value for the threshold from a plurality of threshold values based on at least one reference signal received from a cell in wireless communication with the UE during the last tracking loop update.

Example 5: The method of any of examples 1 through 4, wherein the selecting the threshold value comprises: determining a cell quality mode of the cell based on the at least one reference signal; and selecting the threshold value for the threshold based on the cell quality mode.

Example 6: The method of example 5, wherein the cell quality mode comprises a cell excellent mode, a cell normal mode, or a cell panic mode.

Example 7: The method of example 5 or 6, wherein the determining the cell quality mode further comprises: obtaining a signal-to-noise ratio (SNR) measurement of the at least one reference signal; and determining the cell quality mode based on the SNR measurement.

Example 8: The method of any of examples 1 through 7, wherein the performing the rude wake-up event without performing the at least one tracking loop update comprises: performing the rude wake-up event utilizing the last tracking loop update.

Example 9: The method of any of examples 1 through 8, wherein the threshold is a factory setting on the UE.

Example 10: The method of any of examples 1 through 9, wherein the rude wake-up event comprises: transmitting a random access channel (RACH) message to a cell in wireless communication with the UE to transition to a radio resource control (RRC) connected mode in response to the DRX mode comprising an idle DRX mode; or transmitting a scheduling request to the cell in response to the DRX mode comprising a connected DRX mode.

Example 11: A wireless communication device configured for wireless communication comprising a wireless transceiver, a memory, and processor coupled to the wireless transceiver and the memory, the processor and memory configured to perform a method of any one of examples 1 through 10.

Example 12: A wireless communication device in a wireless communication network comprising at least one means for performing a method of any one of examples 1 through 10.

Example 13: An article of manufacture for use by a user equipment (UE) in a wireless communication network, the article comprising a computer-readable medium having stored therein instructions executable by one or more processors of the UE to perform a method of any one of examples 1 through 10.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 10, and 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A wireless communication device configured for wireless communication, comprising:
a wireless transceiver;
a memory; and
a processor coupled to the wireless transceiver and the memory, wherein the processor and the memory are configured to:
enter a sleep state for a sleep period in a discontinuous reception (DRX) mode;
transition to an active state to perform a rude wake-up event during the sleep period;
identify a time difference between a last tracking loop update and a warm-up occasion associated with the rude wake-up event;
perform at least one tracking loop update during the warm-up occasion prior to performing the rude wake-up event in response to the time difference being greater than a threshold; and perform the rude wake-up event without performing the at least one tracking loop update in response to the time difference being less than or equal to the threshold.

2. The wireless communication device of claim 1, wherein the processor and the memory are further configured to:

perform at least one of a time tracking loop (TTL) update or a frequency tracking loop (FTL) update.

3. The wireless communication device of claim 1, wherein the processor and the memory are further configured to:

receive at least one reference signal from a cell in wireless communication with the wireless communication device, wherein the at least one reference signal comprises a synchronization signal block (SSB) or a channel state information reference signal (CSI-RS); and utilize the at least one reference signal to perform the at least one tracking loop update.

4. The wireless communication device of claim 1, wherein the processor and the memory are further configured to:

select a threshold value for the threshold from a plurality of threshold values based on at least one reference signal received from a cell in wireless communication with the wireless communication device during the last tracking loop update.

5. The wireless communication device of claim 4, wherein the processor and the memory are further configured to:

determine a cell quality mode of the cell based on the at least one reference signal; and select the threshold value for the threshold based on the cell quality mode.

6. The wireless communication device of claim 5, wherein the cell quality mode comprises a cell excellent mode, a cell normal mode, or a cell panic mode.

7. The wireless communication device of claim 5, wherein the processor and the memory are further configured to:

obtain a signal-to-noise ratio (SNR) measurement of the at least one reference signal; and determine the cell quality mode based on the SNR measurement.

8. The wireless communication device of claim 1, wherein the processor and the memory are further configured to:

perform the rude wake-up event utilizing the last tracking loop update.

9. The wireless communication device of claim 1, wherein the threshold is a factory setting on the wireless communication device.

10. The wireless communication device of claim 1, wherein the processor and the memory are further configured to:

perform the rude wake-up event by:
transmitting a random access channel (RACH) message to a cell in wireless communication with the wireless communication device to transition to a radio resource control (RRC) connected mode in response to the DRX mode comprising an idle DRX mode; or transmitting a scheduling request to the cell in response to the DRX mode comprising a connected DRX mode.

11. A method for wireless communication at a user equipment (UE), the method comprising:

entering a sleep state for a sleep period in a discontinuous reception (DRX) mode;

transitioning to an active state to perform a rude wake-up event during the sleep period;

identifying a time difference between a last tracking loop update and a warm-up occasion associated with the rude wake-up event;

performing at least one tracking loop update during the warm-up occasion prior to performing the rude wake-up event in response to the time difference being greater than a threshold; and performing the rude wake-up event without performing the at least one tracking loop update in response to the time difference being less than or equal to the threshold.

12. The method of claim 11, wherein the performing the at least one tracking loop update further comprises:

performing at least one of a time tracking loop (TTL) update or a frequency tracking loop (FTL) update.

13. The method of claim 11, wherein the performing the at least one tracking loop update further comprises:

receiving at least one reference signal from a cell in wireless communication with the UE, wherein the at least one reference signal comprises a synchronization signal block (SSB) or a channel state information reference signal (CSI-RS); and utilizing the at least one reference signal to perform the at least one tracking loop update.

14. The method of claim 11, further comprising:

selecting a threshold value for the threshold from a plurality of threshold values based on at least one reference signal received from a cell in wireless communication with the UE during the last tracking loop update.

15. The method of claim 14, wherein the selecting the threshold value comprises:

determining a cell quality mode of the cell based on the at least one reference signal; and selecting the threshold value for the threshold based on the cell quality mode.

16. The method of claim 15, wherein the cell quality mode comprises a cell excellent mode, a cell normal mode, or a cell panic mode.

17. The method of claim 15, wherein the determining the cell quality mode further comprises:

obtaining a signal-to-noise ratio (SNR) measurement of the at least one reference signal; and determining the cell quality mode based on the SNR measurement.

18. The method of claim 11, wherein the performing the rude wake-up event without performing the at least one tracking loop update comprises:

performing the rude wake-up event utilizing the last tracking loop update.

19. The method of claim 11, wherein the threshold is a factory setting on the UE.

20. The method of claim 11, wherein the rude wake-up event comprises:

transmitting a random access channel (RACH) message to a cell in wireless communication with the UE to transition to a radio resource control (RRC) connected mode in response to the DRX mode comprising an idle DRX mode; or transmitting a scheduling request to the cell in response to the DRX mode comprising a connected DRX mode.

21. A wireless communication device in a wireless communication network, comprising:
- means for entering a sleep state for a sleep period in a discontinuous reception (DRX) mode;
- means for transitioning to an active state to perform a rude wake-up event during the sleep period;
- means for identifying a time difference between a last tracking loop update and a warm-up occasion associated with the rude wake-up event;
- means for performing at least one tracking loop update during the warm-up occasion prior to performing the rude wake-up event in response to the time difference being greater than a threshold; and
- means for performing the rude wake-up event without performing the at least one tracking loop update in response to the time difference being less than or equal to the threshold.

22. The wireless communication device of claim 21, wherein the means for performing the at least one tracking loop update further comprises:
- means for performing at least one of a time tracking loop (TTL) update or a frequency tracking loop (FTL) update.

23. The wireless communication device of claim 21, wherein the means for performing the at least one tracking loop update further comprises:
- means for receiving at least one reference signal from a cell in wireless communication with the wireless communication device, wherein the at least one reference signal comprises a synchronization signal block (SSB) or a channel state information reference signal (CSI-RS); and
- means for utilizing the at least one reference signal to perform the at least one tracking loop update.

24. The wireless communication device of claim 21, further comprising:
- means for selecting a threshold value for the threshold from a plurality of threshold values based on at least one reference signal received from a cell in wireless communication with the wireless communication device during the last tracking loop update.

25. The wireless communication device of claim 24, wherein the means for selecting the threshold value comprises:
- means for determining a cell quality mode of the cell based on the at least one reference signal; and
- means for selecting the threshold value for the threshold based on the cell quality mode.

26. The wireless communication device of claim 25, wherein the cell quality mode comprises a cell excellent mode, a cell normal mode, or a cell panic mode.

27. The wireless communication device of claim 25, wherein the means for determining the cell quality mode further comprises:
- means for obtaining a signal-to-noise ratio (SNR) measurement of the at least one reference signal; and
- means for determining the cell quality mode based on the SNR measurement.

28. The wireless communication device of claim 21, wherein the means for performing the rude wake-up event without performing the at least one tracking loop update comprises:
- means for performing the rude wake-up event utilizing the last tracking loop update.

29. The wireless communication device of claim 21, wherein the threshold is a factory setting on the wireless communication device.

30. The wireless communication device of claim 21, further comprising:
- means for performing the rude wake-up event by:
  - transmitting a random access channel (RACH) message to a cell in wireless communication with the wireless communication device to transition to a radio resource control (RRC) connected mode in response to the DRX mode comprising an idle DRX mode; or
  - transmitting a scheduling request to the cell in response to the DRX mode comprising a connected DRX mode.

* * * * *